United States Patent [19]

Suzuki

[11] Patent Number: 5,418,949
[45] Date of Patent: May 23, 1995

[54] PAGE MAP, METAMAP, AND RELATION GROUP FILE MANAGEMENT SUPERVISED BY OPERATION MEANS FOR ALLOCATING, STORING, AND SEARCHING FRIENDLY AND EXCLUSIVE DATA ITEMS

[75] Inventor: Yasuhiro Suzuki, Kawasaki, Japan
[73] Assignee: Fujitsu Limited, Kanagawa, Japan
[21] Appl. No.: 129,853
[22] Filed: Sep. 30, 1993
[30] Foreign Application Priority Data
  Sep. 30, 1992 [JP] Japan .................. 4-260469
[51] Int. Cl.⁶ .................................. G06F 15/40
[52] U.S. Cl. ........................ 395/600; 395/425; 364/419.07; 364/419.19; 364/283.1; 364/DIG. 1
[58] Field of Search ............. 395/600, 425, 419.07, 395/419.19

[56] References Cited

U.S. PATENT DOCUMENTS

| | | | |
|---|---|---|---|
| 4,536,837 | 8/1985 | Olson et al. | 395/600 |
| 4,611,272 | 9/1986 | Lomet | 395/600 |
| 4,680,703 | 7/1987 | Kriz | 395/425 |
| 4,989,134 | 1/1991 | Shaw | 395/425 |
| 5,146,580 | 9/1992 | Naidu et al. | 395/425 |
| 5,204,958 | 4/1993 | Cheng et al. | 395/600 |
| 5,280,599 | 1/1994 | Arai | 395/425 |

FOREIGN PATENT DOCUMENTS 62-209616 9/1987 Japan .

OTHER PUBLICATIONS

Tama'r et al. "Multi-level Coherency Management For High-Performance Shared Virtual Memory Multicomputers", *Tenth Annual International Phoenix Conference on Computers and Communications*, 27-30 Mar. 1991, pp. 174-181.

Primary Examiner—Thomas G. Black
Assistant Examiner—Paul R. Lintz

[57] ABSTRACT

A file storage management system for managing pages in a file, in which pages, data items belonging to a plurality of relations are stored. The file storage management system includes a data file for storing data items belonging to relations page by page, a page map file storing information representing positions at which data pages and empty pages are positioned in the file, a metamap file for storing metamap information representing whether or not the data empty pages and the data pages exist in each page map, relation group definition file for information representing whether relations are friendly relations or exclusive relations a page management unit for managing the data file, a page map management unit for managing the page map file, a metamap management unit for managing the metamap file, a relation group management unit for managing the relation group definition file, and page operation unit for operating the page management unit, the page map management unit, the metamap management unit, the relation group management unit so that a process for allocating data items belonging to relations to pages, and a process for searching for pages to be released from management in the system and for pages storing data items to be loaded into a main memory are carried out.

14 Claims, 19 Drawing Sheets

FIG. 12

| | ITEMS | EXAMPLE OF STATE |
|---|---|---|
| a | COMMAND | ALLOCATE |
| b | RELATION IDENTIFICATION TO BE ALLOCATED TO PAGE | RELATION 1 |
| c | PAGE ADD. OF CURRENT DATA PAGE | 3 |
| d | BUFFER POINTER OF CURRENT DATA PAGE | POINTER VALUE |
| e | PAGE ADD. OF CURRENT PMAP | 1 |
| f | FLAG OF CURRENT PMAP | 1 (UPDATED) |
| g | CURRENT GMSK | GMSK CORRESPONDING TO RELATION 1 |
| h | CURRENT ALLOCATING MMAP | 10000000 |
| i | CURRENT LOADING MMAP | 00000000 |

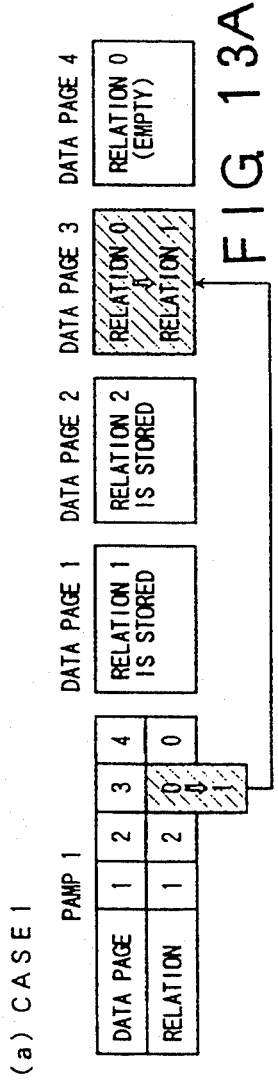
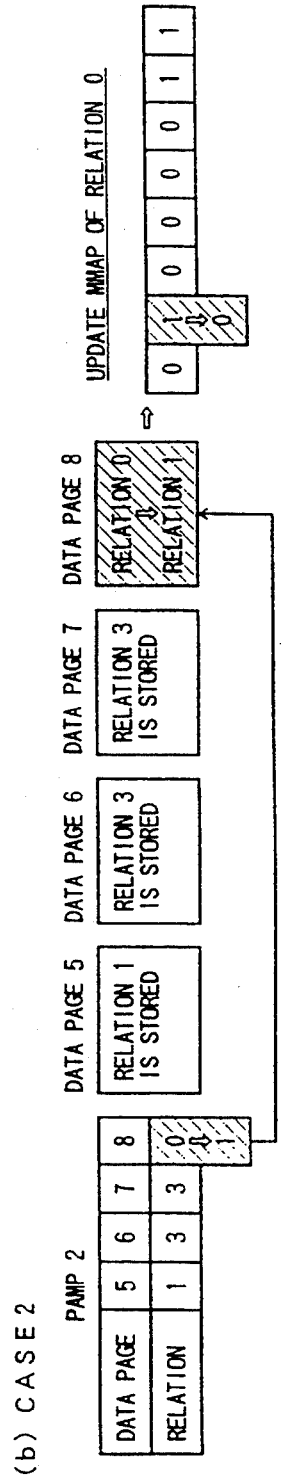

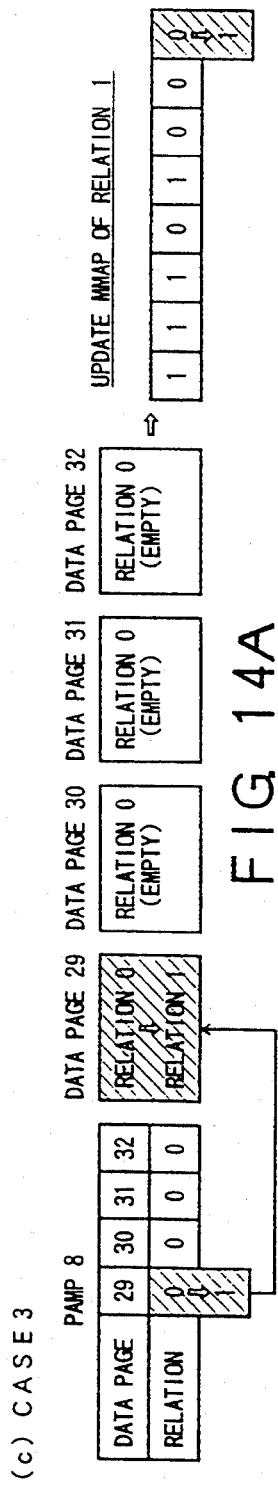
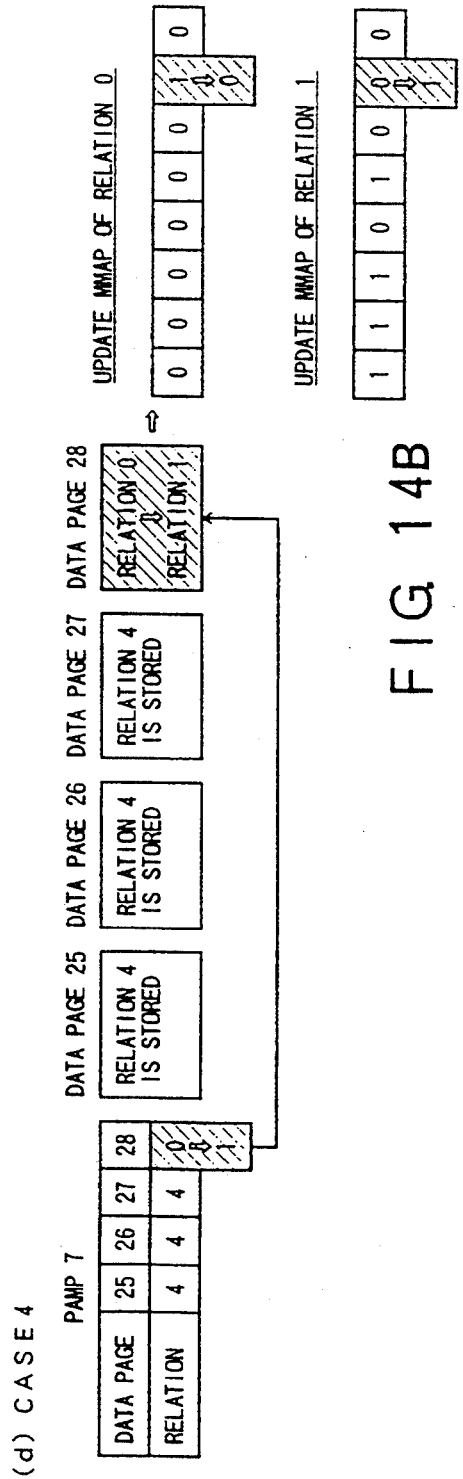
FIG. 14A
FIG. 14B

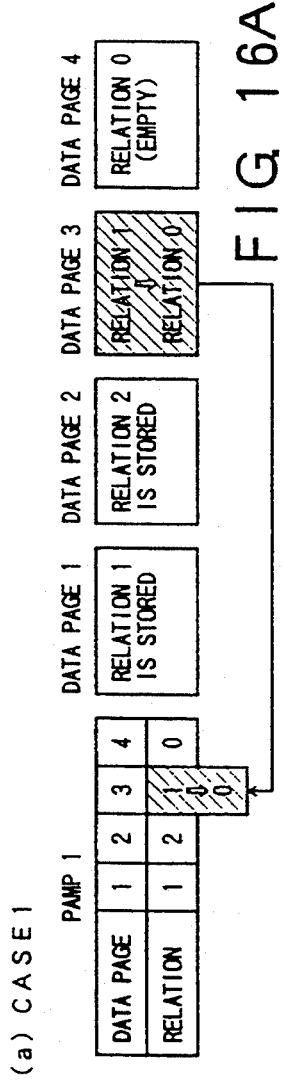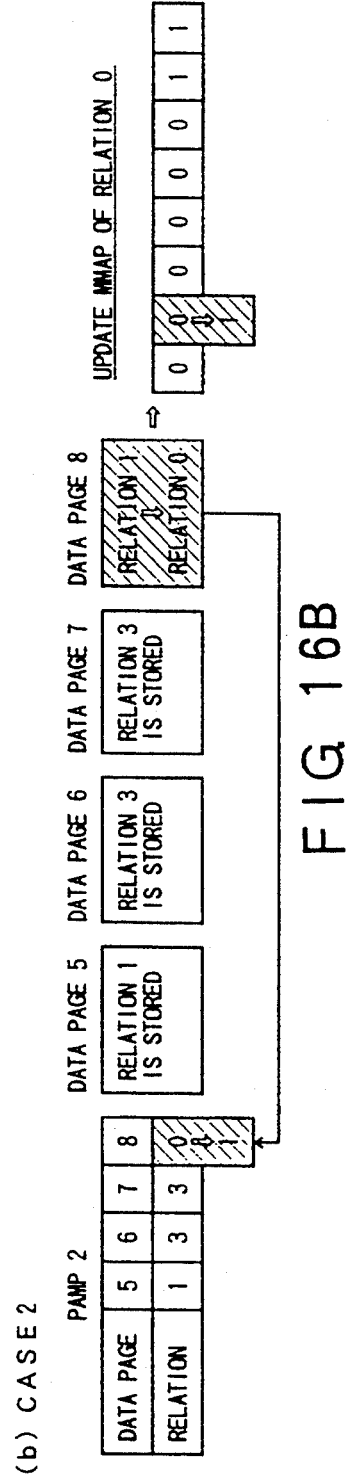

(c) CASE 3

(d) CASE 4

PAGE MAP, METAMAP, AND RELATION GROUP FILE MANAGEMENT SUPERVISED BY OPERATION MEANS FOR ALLOCATING, STORING, AND SEARCHING FRIENDLY AND EXCLUSIVE DATA ITEMS

BACKGROUND OF THE INVENTION (1) Field of the Invention

The present invention generally relates to a file storage management system used for a database in which the so-called clustering is promoted, and more particularly to a file storage management system in which data items are arranged in a data storage file so as to be close to each other in accordance with the relevance among a plurality of relations each of which is a set of data items in a database.

In an engineering application field such as a field of a CAD (Computer Aided Design), high speed responses are required under conditions in which processing and computation with respect to a large amount of data are being performed. Thus, a relational database management system (RDBMS) suitable for business processing by which simple numerical computation of employee information is performed and character strings are treated is not suited for the engineering application field.

(2) Description of the Related Art

In a conventional relational database management system (RDBMS), relations each of which is a set of data items are managed so as to be independent from each other. On the other hand, in the engineering application field, there are many dependent relationships as components among data items. Since overhead occurs when the relations coupled to each other under dependent relationships are loaded into a main storage, the RDBMS is not suited for the engineering application field.

An object-oriented data base system (OODBMS) has been recently proposed for the engineering application field. In the OODBMS, data items relevant to each other are arranged so as to be physically close to each other, and the data items relevant to each other are loaded into the main storage at once to the utmost, so that the response in a case using the database is improved. In, for example, an "O2" which is the OODBMS developed in Altair of France (Fernando Velez, Guy Bernard, Vineeta Daris: The O2 Object Manager: an Overview Proc. 15th VLDB Conf. 1989) and a "WiSS" which is a storage management system developed in Wisconsin university in U.S. (H-T. Chou, David J. Dewiti, Rnady H, Katz, Nothony C. Klug: Design and Implementation of the Wisconsin Storage System, Software Practice and Experience, Vol. 15 (10) pp. 943-962, 1985), the above relationships among data items are realized as follows.

(1) The clustering regarding records is used in which records having data items relevant to each other are arranged in the same page to the utmost.

(2) The chaining of data items in the same relation is formed by using of address linkage.

A description will now be given, with reference to FIG. 1, of the concept of the clustering.

In an example shown in FIG. 1, each of data items used in a CAD for circuit design belongs one of three kind of relations: a "symbol" representing components in an electrical circuit, a "pin" representing pins of each of the components, and a "net" representing connection of signal lines to the pins of each of the components.

The "pin" depends on the "symbol" so that a relationship of "pin is a part of symbol" exists. When a symbol (an owner) is made, a set of pins (members) dependent thereon is also made, and when the symbol (the owner) is withdrawn from the file, the set of pins (members) dependent thereon is also withdrawn. That is, the "symbol" and the "pin" are statically closely related to each other. On the other hand, although there may be a case where a plurality of pins depends on a net in a connecting state of signal lines and pins, the dependent relationship between the "pin" and the "net" is changed due to changing the connecting state of the signal lines and pins. Thus, data items belonging to the "symbol" and the "pin" should be arranged so as to be close to each other in the file, but it is not preferable that data items belonging to the "pin" and the "net" be arranged so as to be close to each other.

In the example in which the database is formed in a secondary storage device (e.g. a magnetic disk device) as shown in a bottom portion of FIG. 1, data items of "net 1, net 2, ..." belonging to the "net" are stored in a page (n) different from those in which data items belonging to the "symbol" and the "pin" are stored. As to the "symbol" and the "pin", the clustering regarding the record is applied to the file so that data items of "symbol 1 and symbol 2" and sets of pins dependent on the symbols 1 and 2 are stored in a page (7). However, pins dependent on data items of "symbol 3 and symbol 4" are stored a different page if the page (7) does not have enough remaining area to store them. In this embodiment, the pins dependent on the data items of "symbol 3 and symbol 4", other data items "symbol 5, ..." and pins dependent on the other data items are stored in a page (8) separated from the page (n).

However, in the above clustering regarding the record, there is no guarantee that pages in which data items belonging to the "symbol" and "pin" are stored are located so as to be close to each other, and that a page in which data items belonging to the "net" is separated from the above pages. That is, the clustering regarding the page is not guaranteed.

In addition, in each of relations such as the "symbol", "pin" and "net", the chaining of data items is represented by the "address-linkage" using record addresses or page addresses. Although there is no order relationship among the relations, the "address-linkage" is used. If the order relationship is needed among the relations, the address-linkage is generally represented by a secondary index such as a B-tree.

In a case where data items belonging to each relation or belonging to a plurality of relations relevant to each other are loaded into the main storage at once, a navigation of the address-linkage is performed. In this case, there is no guarantee that addresses in the address-linkage are arranged in a physical order of pages. The address-linkage represents the changing of data items in only a single relation, so that the navigation of the address-linkage must be repeated at a number of times corresponding to a number of relations in a case where data items belonging to a plurality of relations are loaded into the main storage.

However, it takes a long time to perform a physical operation required for a access of a single record in the secondary storage unit (e.g. the magnetic disk unit) having many records on which data items belonging to the relations relevant to each other are stored. Thus, it is desirable that the number of accesses to the secondary storage unit (e.g. the magnetic disk unit) be as small as possible. For this reason, areas in which data items are to be stored must be arranged so as to be close to each other to the utmost or so as to be separated from each other in accordance with the owner-member relationship/inclusion relationship of classes.

In the light of the above matter, the conventional system of "clustering regarding the record" has the following disadvantages.

(1) Pages in which data items belonging to relations relevant to each other are not always arranged so as to be close to each other.

(2) When data items belonging to relations are loaded into the main storage at once, the data items can not read out, in an order in which data items are physically arranged in the secondary storage unit, from the secondary storage unit. Thus, the number of seek operations in the secondary storage unit is increased.

SUMMARY OF THE INVENTION

Accordingly, the general object of the present invention is to be provide a novel and useful file storage management system in which the disadvantages of aforementioned prior art are eliminated.

A more specific object of the present invention is to be provide a file storage management system used for a database in which the clustering regarding the page can be achieved at a high level.

Another object of the present invention is to provide a file storage management system used for a database in which data items belonging to relations relevant to each other can be loaded from a secondary storage unit into a main storage at a high speed.

The above objects of the present invention are achieved by a file storage management system for managing pages in a file, in which pages data items belonging to a plurality of relations are stored, the file storage management system comprising: a data file for storing data items belonging to relations page by page; a page map file storing information representing positions at which data pages and empty pages are positioned in the file, the data pages storing data items belonging to relations, the empty pages storing no data item; a metamap file for storing metamap information representing whether or not the data empty pages and the data pages exist in each page map; relation group definition file for information representing whether relations are friendly relations or exclusive relations, the friendly relations being relations relevant to each other and being to be arranged close to each other, the exclusive relations being relations not relevant to each other; page management means for managing the data file; page map management means for managing the page map file; metamap management means for managing the metamap file; relation group management means for managing the relation group definition file; and page operation means for operating the page management means, the page map management means, the metamap management means, the relation group management means so that a process for allocating data items belonging to relations to pages, and a process for searching for pages to be released from management in the system and for pages storing data items to be loaded into a main memory are carried out.

According to the present invention, as the pages for relations and the empty relations are managed using page map information, a system in which the clustering regarding the page can be achieved at a high level. In addition, the system in which data items belonging to relations relevant to each other can be loaded from a secondary storage unit into a main storage at a high speed.

Additional objects, features and advantages of the present invention will become apparent from the following detailed description when read in conjunction with the accompanying drawings.

BRIEF DESCRIPTION OF THE DRAWINGS

FIG. 9 is a diagram illustrating concrete examples of page maps to which pages are to be allocated (a part 1).

FIG. 10 is a diagram illustrating concrete examples of page maps to which pages are to be allocated (a part 2).

FIG. 12 is a diagram illustrating a common control table.

FIG. 13 is a diagram illustrating examples of allocating of data pages from the page map (a part 1).

FIG. 14 is a diagram illustrating examples of allocating of data pages from the page map (a part 2).

FIG. 16 is a diagram illustrating concrete examples of a releasing process of data pages (a part 1).

DESCRIPTION OF THE PREFERRED EMBODIMENTS

A description will now be given, with reference to FIG. 2, of the principle of a file storage management system according to the present invention.

Figure 1:
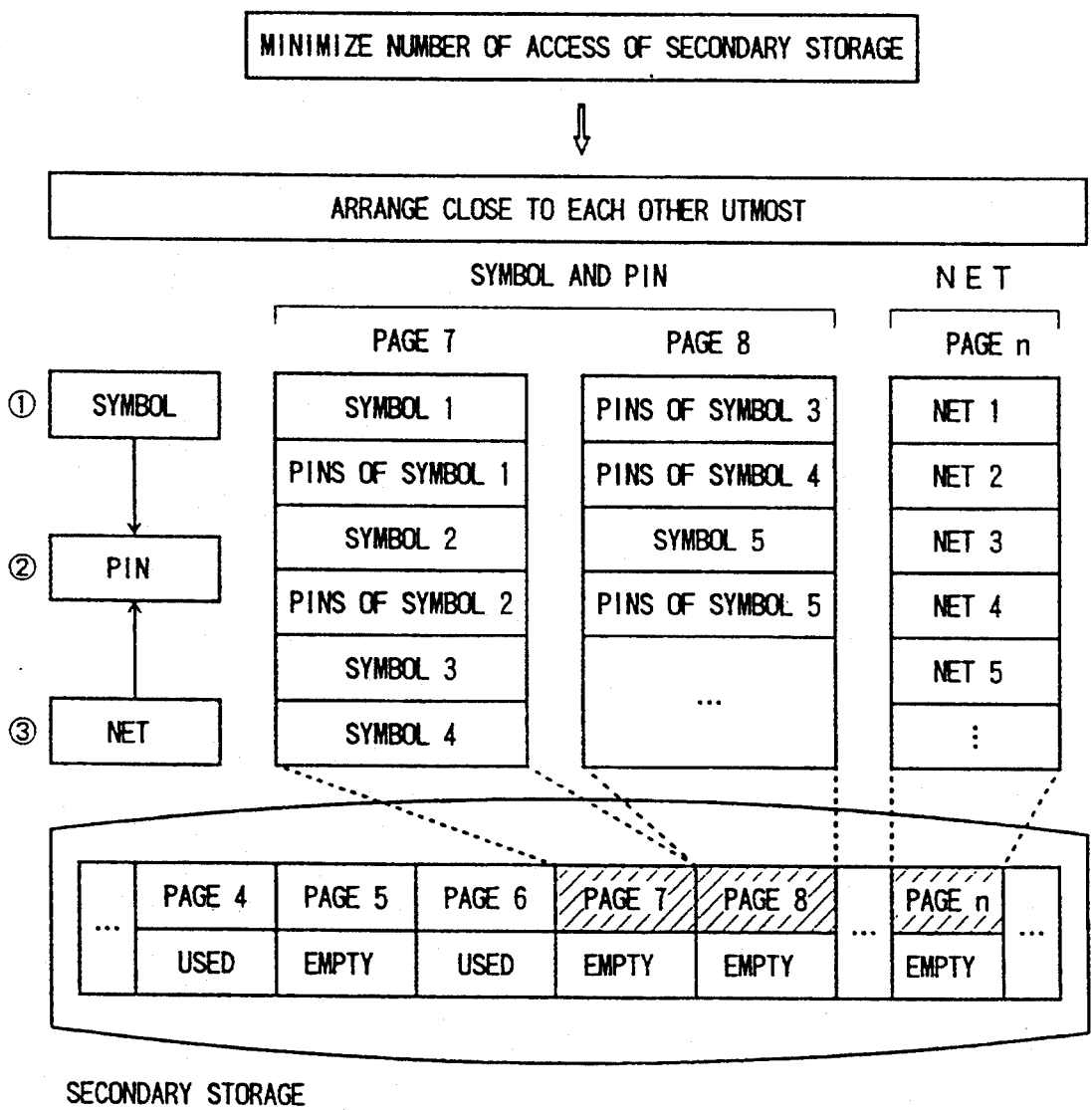
FIG. 1 is a diagram illustrating the concept of the clustering.
Figure 2:
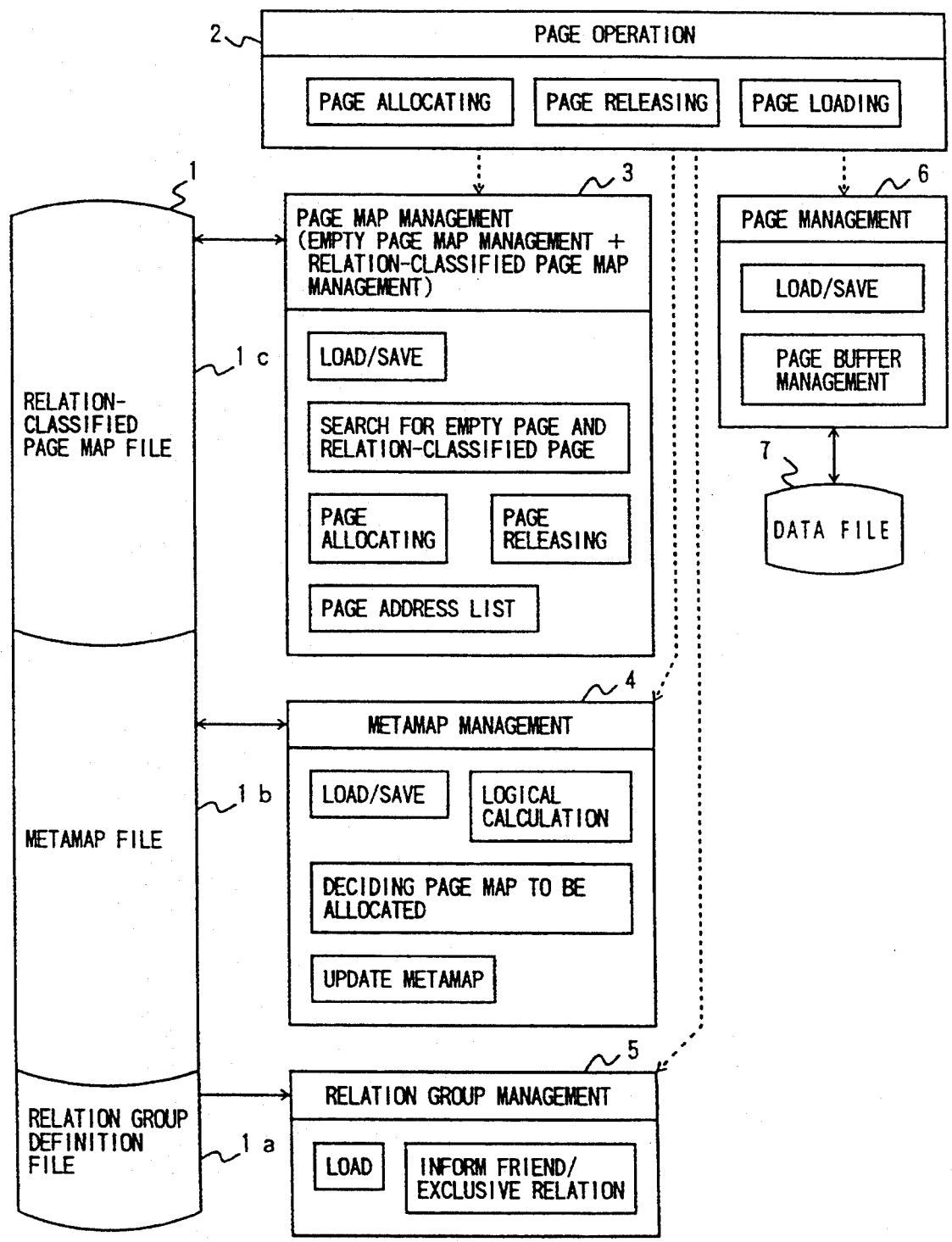
FIG. 2 is a block diagram illustrating the principle of a file storage management system according to the present invention.

Referring to FIG. 2, the system has a management file 1, a page operation unit 2, a page map management unit 3, a metamap management unit 4, a relation group management unit 5 and a page management unit 6. The page management unit 6 coupled to a data file 7 in which data items are stored page by page. The management file 1 includes a relation group defining file 1a, a metamap file 1b and a relation-classified page map file 1c. The page operation unit 2 is operatively coupled to the page map management unit 3, the metamap management unit 4, the relation group management unit 5 and the page management unit 6. The page map management unit 3 carries out management of empty page maps and relation-classified page maps using the relation-classified page map file 1c. The metamap management unit 4 carries out a process using the metamap file 1b. The relation group management unit 5 carries out a process using the relation group defining file 1a by which interrelationships between relation identifications (identification numbers) are defined. The page management unit 6 carries out a management in which the data file 7 is accessed page by page and data items are loaded into the data file 7 or are saved therein.

The file storage management system according to the present invention is provided with a relation-classified mask defining relationships indicating whether data items belonging to a plurality of relations are to be stored in the data file so as to be close to each other or so as to be separated from each other. The file storage management system is also provided with a relation-classified metamap which is data indicating whether or not data items belonging to each relation exists in a page map and indicating a page map having an empty area, and a page map allocated to a plurality of data pages and indicating relations stored in the data pages. In the file storage management system, when a page operation is performed, the relation group management unit, metamap management unit are operated so that a page allocating process, a page releasing process and a page loading process are executed.

The data file 7 is provided with many data pages, each data page has data items belonging to each relation or is in an empty state. Page map information is stored in the relation-classified page map file 1c, the page map information indicating a used/empty state of each data page in the data file 7 and indicating an empty identification information for a data page in the empty state and relation identification of a relation stored in a data page in the used state.

The metamap file 1b is provided with metamap information in which empty pages in the page map pages of the relation-classified file 1c and a flag indicating whether or not data items belonging to each relation exist are recorded. The relation group defining file 1a is provided with information indicating whether relations are relevant so that they should be arranged close to each other or are not relevant so that they need not be arranged close to each other. The relations relevant to each other are referred to as friendly relations, and the relations not relevant to each other are referred to as exclusive relations.

The page operation unit 2 carries out a page allocating operation for storing data items in the data file in accordance with requirements, a page releasing operation for making data pages become empty, and a loading operation for loading pages corresponding to required relations into a main memory. These operations are executed by controls of page map management unit 3, the metamap management unit 4, the relation group management unit 5 and the page management unit 6.

The page map management unit 3 carries out load/save operations with respect to the page map information of the relation-classified page map file 1c, searches for empty pages and pages allocated to each relation in the data file, carries out processes in accordance with the page allocating operation and the page releasing operation of the page operation unit 2. The page management unit 3 makes also an address list of pages to be loaded at once in a process in accordance with the loading operation.

The metamap management unit 4, in the page allocating operation, checks a number of empty pages in allocated page map pages using the metamap file 1b. When there is no empty page, the metamap management unit 4 makes indication of the empty pages be in a nothing state. When a new page is allocated to a required relation, the flag corresponding to a page map number (a page map page) in the metamap information with respect to the relation is updated to be in a state where data items exist. In the page releasing operation, when it is detected that there is no page for the relation, the flag corresponding to the page map number in the meta map information is made to be in a state where no page exists. In a case where a new empty page is made, a corresponding flag is made in a state where the empty page exists.

The relation group management unit 5 manages the relation group definition file 1a, reads out, from the relation definition file 1a, data item in a friendly relation group, an exclusive relation group and an empty relation group corresponding to a relation to which a page is to be allocated, and supplies them to the page operation unit 2.

In the page allocating operation, the metamap management unit 4 receives the friendly relations, the exclusive relations and empty relations from the relation group management unit 5, and carries out a logical operation of them so that a friendly metamap and an exclusive metamap were made. The metamap management unit 4 searches for a page map allocated to a relation using the information of the empty relation group. When the page map is detected, the page map is supplied to the page operation unit 2. When the page operation unit 2 transmits the page map to the page map management unit 3, the page map management unit 3 searches for the empty data page from the page map using the relation-classified page map file 1c. The data page to be assigned to the relation is supplied to the page operation unit 2, and the data page is further supplied from the page operation unit 2 to the page management unit 6. The page management unit 6 reads data items from the data page in the data file 7 and loads the data items into a page buffer in the main memory (not shown).

The page releasing operation and the page loading operation in the page operation unit 2 are also performed by the respective management unit 3–6 using the files.

A description will now be given of a file storage management system according to an embodiment of the present invention.

Figure 3:
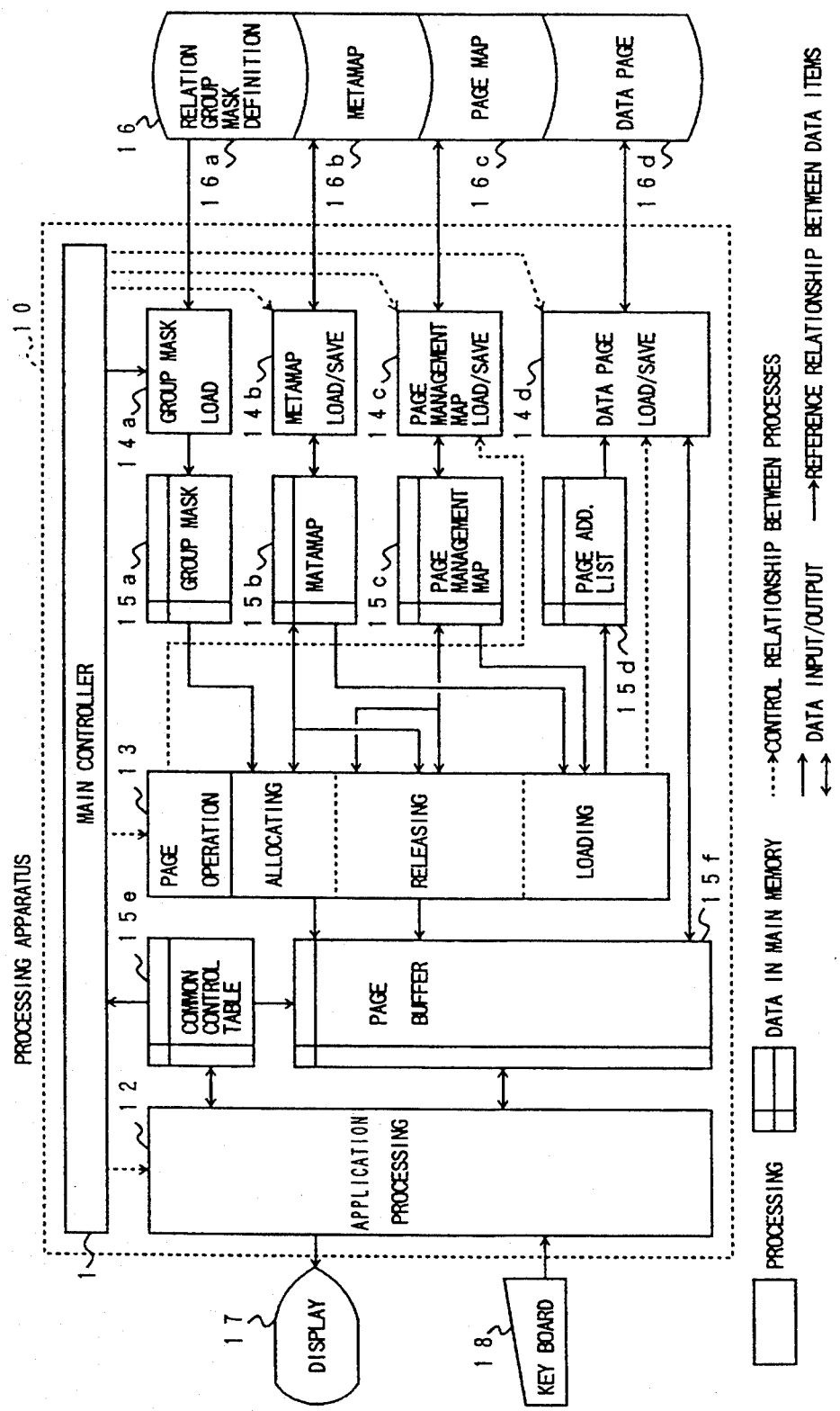
FIG. 3 is a block diagram illustrating a file storage management system according to an embodiment of the present invention.

In this embodiment, the file storage management system is formed as shown in FIG. 3. Referring to FIG. 3, a processing apparatus 10 including a CPU and a main memory is coupled to a secondary storage unit 16 for storing management data and data pages, a display unit 17 and a keyboard 18. The processing apparatus 10 has a main controller 11, an application processing unit 12, a page operation unit 13, a group mask loading unit 14a, a metamap loading/saving unit 14b, a page management map loading/saving unit 14c and a data page loading/saving unit 14d. The main memory in the processing apparatus 10 is provided with a group mask 15a, a metamap 15b, a page management map 15c, a page address list 15d, a common control table 15e and a page buffer 15f.

The application processing unit 12 requests to the page operation unit 13, based instructions supplied using the display unit 17 and the keyboard 18, a page allocating process for allocating pages in which data items belonging to relations are to be stored, a page releasing process and a loading process for loading data items into the main memory at once. The data items to be processed and to be computed by the application processing unit 12 are loaded into the page buffer 15f of the main memory at once. The common control table 15e is provided in the processing apparatus 10 to simplify the requests for the page allocating process, the page releasing process and the page loading process with respect to page operations from the application processing unit 12, interface information with respect to application processes for identifying relations for which the page operation is to be performed and to the page operation unit 13, and information corresponding to a present state.

Figure 4:
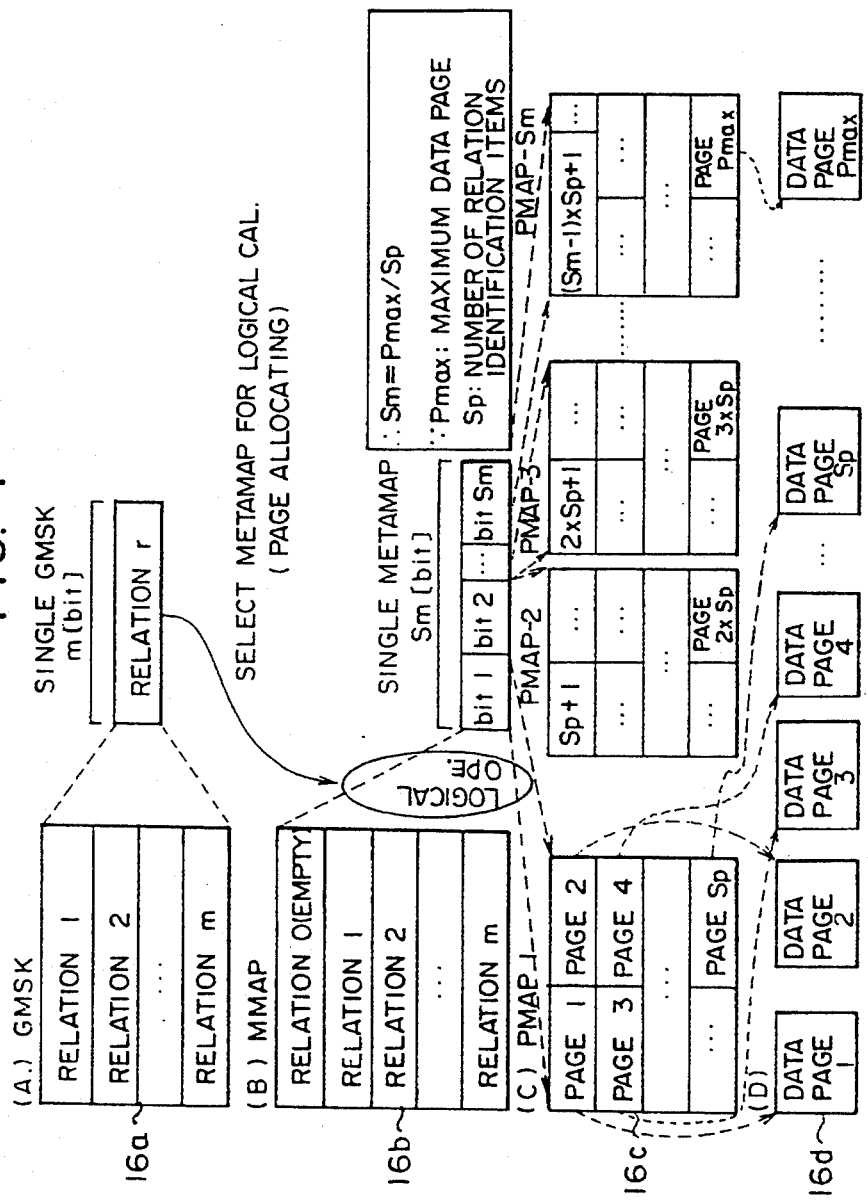
FIG. 4 is a diagram illustrating interrelationships between management information items and between management information items and data pages.

FIG. 4 shows interrelationships between management information items and relationships between the management information items and data pages.

FIG. 3(A) shows relation-classified group masks (GMSK). The respective relation-classified group masks (hereinafter referred to as group masks) correspond to relations (e.g. "symbol", "pin" and "net"). Each of the group masks has m bits equal to the number (m) of relations and each bit corresponds to a relation. Each of the bits of a group mask corresponding to each relation forms a flag indicating a relationship between each relation corresponding to the group mask and a relation identified by a position of each bit. That is, a flag formed of a bit in a group mask indicates whether a relation corresponding to the group mask and a relation identified by a position of the bit are the friendly relations or the exclusive relations. For example, in a case of the friendly relations, the flag (the bit) has a value "1", and in a case of the exclusive relations, the flag has a value "0". The above relation-classified group mask may be referred to as a relation group mask definition.

FIG. 3(B) shows relation-classified metamaps (MMAP). The respective relation-classified metamaps (hereinafter referred to as metamap) correspond to a relation "0" for an empty page and relations "1"–"m" to which data pages are allocated. The numerals "1"–"m" are identification information of the relations. Each of the metamaps has bits corresponding to page maps (PMAP) belonging to each metamap. Each bit of each of metamaps forms a flag indicating whether an empty page ("0") or a page ("1") for the relation exists in a page map identified by a position of each bit.

FIG. 3(C) shows page maps (PMAP). Each of page maps is formed of a predetermined number ($S_p$ in this embodiment) of pages corresponding to data pages in the data file, the number of the page maps is enough to manage all the databases. In this embodiment, $S_m$ page maps are provided in this system, $S_m$ being defined by $$S_m = P_{max} \times S_p$$

where $P_{max}$ is the maximum number of data pages in the data file. Data indicating whether or not a data page corresponding to each page is an empty page, or identification data of a relation for a data page corresponding to each page is recorded in each page of each page map. In this embodiment, the empty pate is treated as a relation "0". Relations to which data items actually used in application processes belong are identified by numerals "1" to "m". FIG. 3(D) shows data pages in the data file, and data items belonging to relations are stored in the respective data pages.

Figure 5:
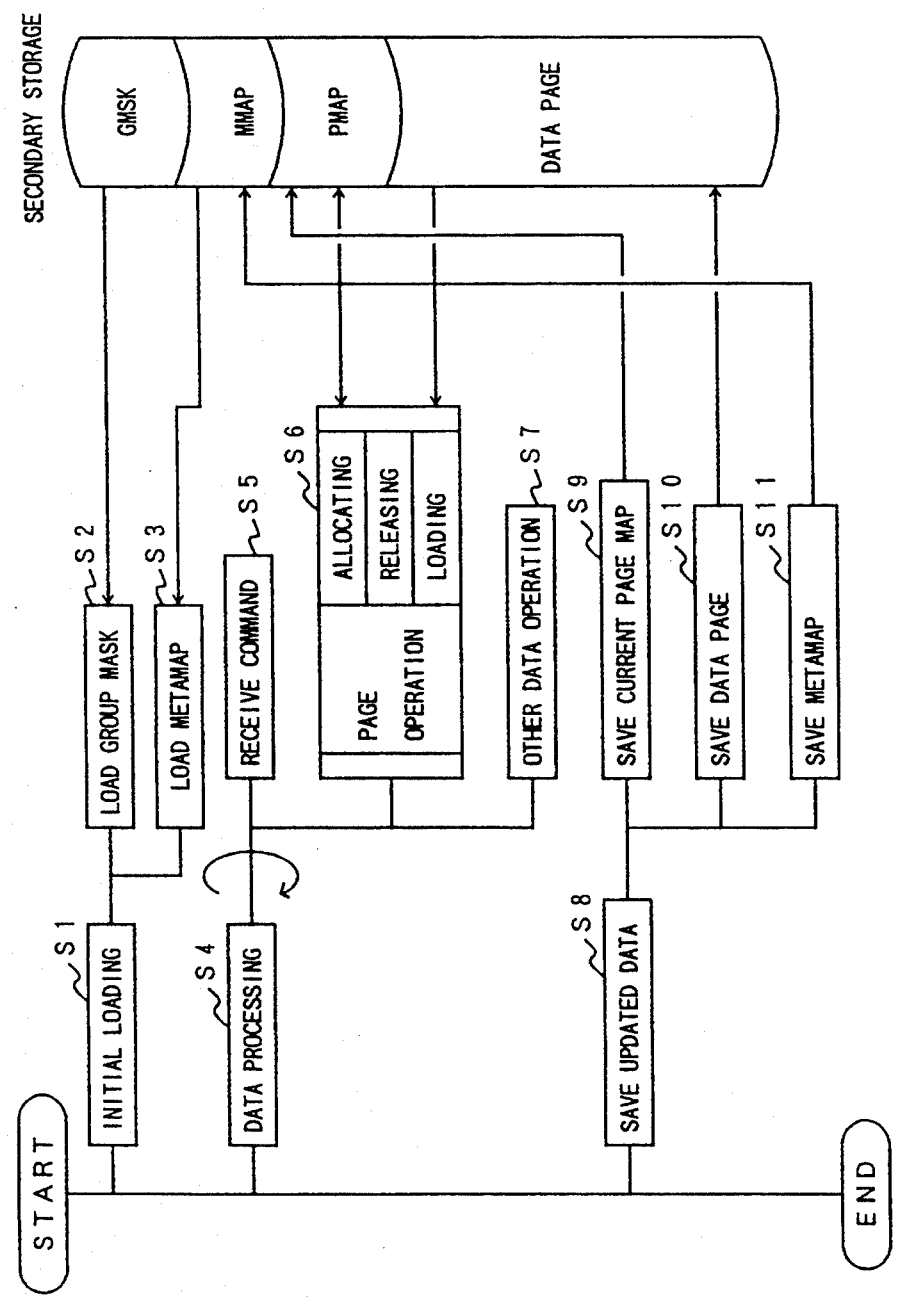
FIG. 5 is a flow chart illustrating a whole process carried out in the system.

A whole process is carried out in accordance with the flow chart shown in FIG. 5. In this flow chart, to simplify an explanation, it is assumed that the relation group (the relation group mask definition) and the metamap is small enough. Further, the information of the page map is independent from the page buffer (indicated by the reference number 15f in FIG. 3) storing data items belonging to relations so that the page map information for only one page always exists in the main memory. A swapping process in which an unnecessary page is returned to the secondary storage unit and a necessary page is loaded in the main memory is performed as occasion arises. When a page of the page map in the main memory is updated, the updated content is saved in the file of the page map at a time the swapping is performed.

Referring to FIG. 5, at a time the system is activated, the relation group (the relation group mask definition) 16a and the metamap 16b are initially loaded from the secondary storage unit 16 to the main memory at once (steps S1 through S3). After desired data items are loaded in the main memory, a data processing is performed (step S4). In this data processing, a page operation (the page allocating operation, the page releasing operation, or the page loading operation) corresponding to commands supplied from the application processing unit 12 and a data operation (computation etc.) peculiar to the application processing are performed (step S5 through S7).

When the application process is completed, updated data items in the main memory are saved in the secondary storage unit 12 (step S8–S11). Concretely, if pages in a current page map loaded in the main memory have been updated, the updated pages are saved in the secondary storage unit 12, and data page and the page map are also saved in the secondary storage unit 12 at once at this time.

The page allocating operation, the page releasing operation and the page loading operation are performed as follows.

Figure 6:
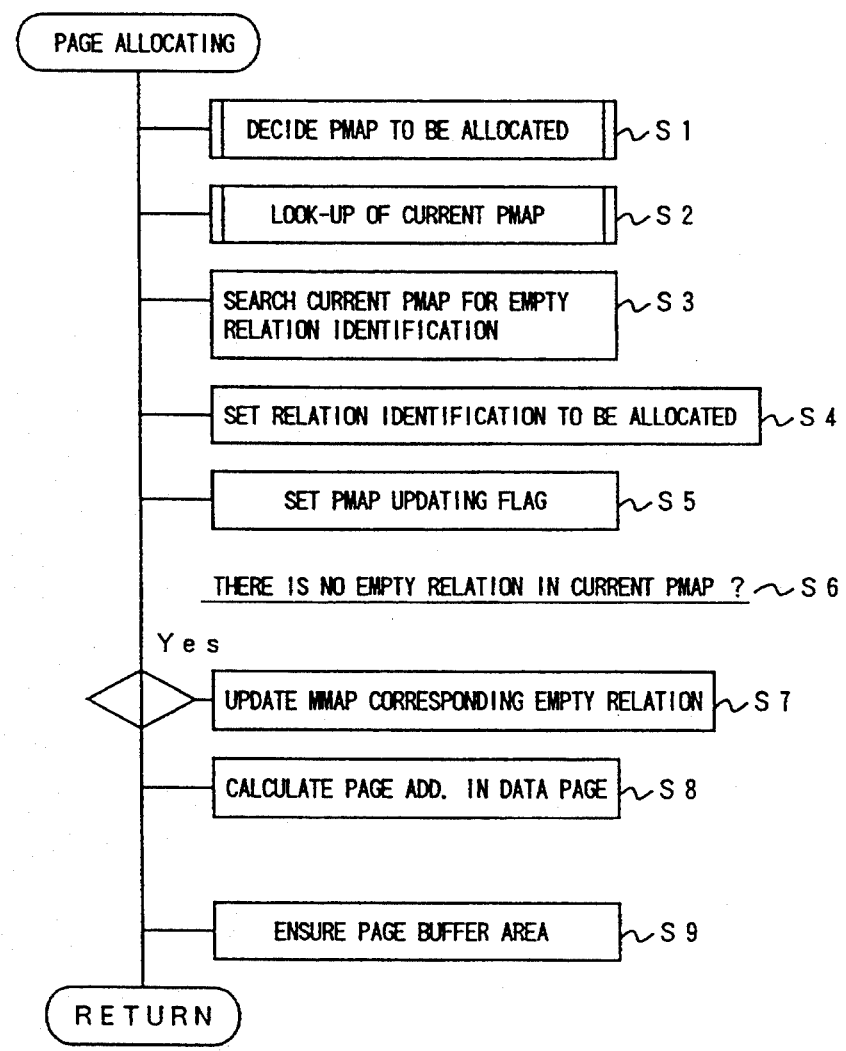
FIG. 6 is a flow chart illustrating a page allocating process.

First, the process based on the page allocating operation is carried out in accordance with the flow chart shown in FIG. 6.

Figure 7:
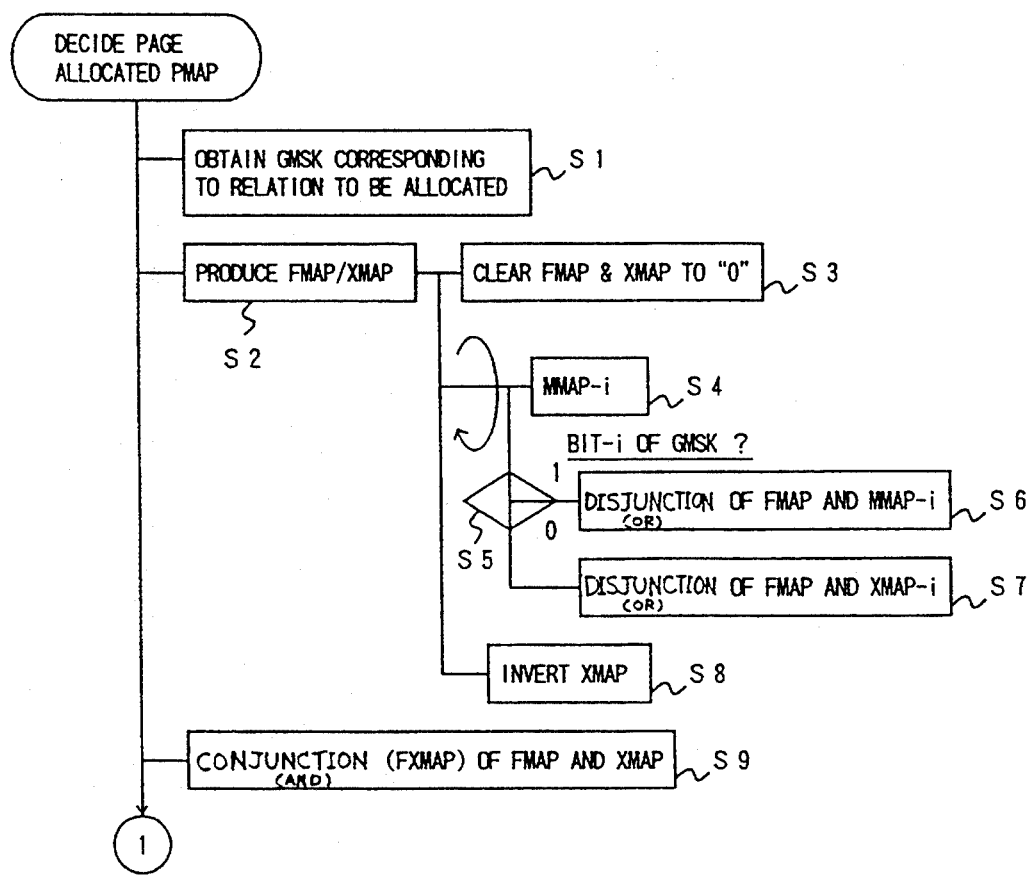
FIG. 7 is a flow chart illustrating a process for determining page allocating PMAP by MMAP (a part 1).
Figure 8:
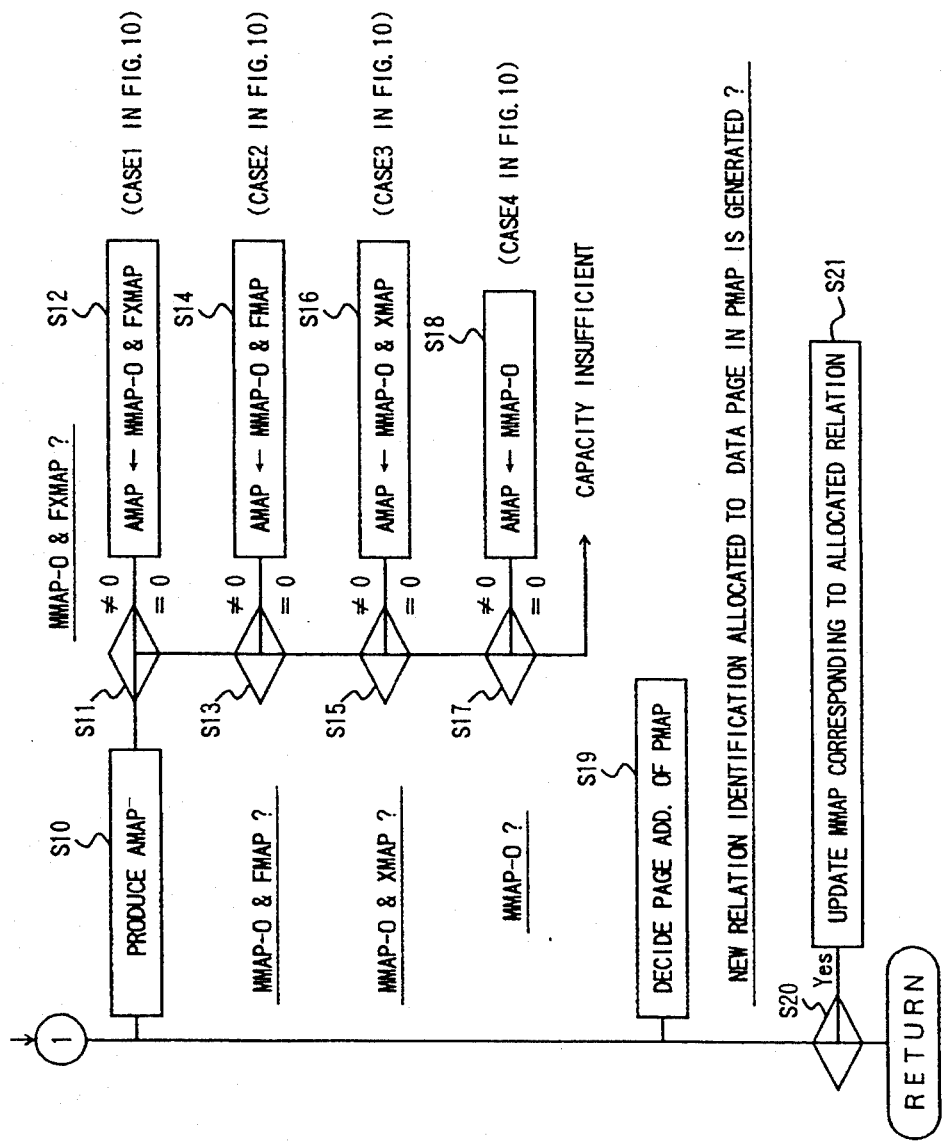
FIG. 8 is a flow chart illustrating a process for determining page allocating PMAP by MMAP (a part 2).

In the process shown in FIG. 6, first, a decision process for deciding a page map (PMAP) which is a target of the page allocating operation is performed (step S1). This decision process is performed in accordance with the flow chart as shown in FIGS. 7 and 8. In this decision process, it is assumed that a page address of the page map (PMAP) for managing a data page to which a relation is to be allocated is denoted by $P_m$. If there is no relation to be allocated to a data page in the page map (PMAP), that is, if a bit value positioned at $P_m$ in the bit sequence of the relation-classified metamap (MMAP-r) is "0", the bit value of the relation-classified metamap is set to "1".

A description will now be given of the decision process shown in FIGS. 7 and 8 with reference to examples shown in FIGS. 9 and 10.

In FIG. 7, a group mask (GMSK) corresponding to a relation to be allocated to a data page is obtained (step S1). That is, as the relation to be allocated to a data page is identified by the relation identification information, the group mask (GMSK) corresponding to the relation is selected. The respective bits of the group mask (GMSK) correspond to relations, a bit having a value "0" represents the exclusive relation of the relation corresponding to the group mask (GMSK), and a bit having a value "1" represents the friendly relation of the relation corresponding to the group mask (GMSK).

Figures 9A, 9B:
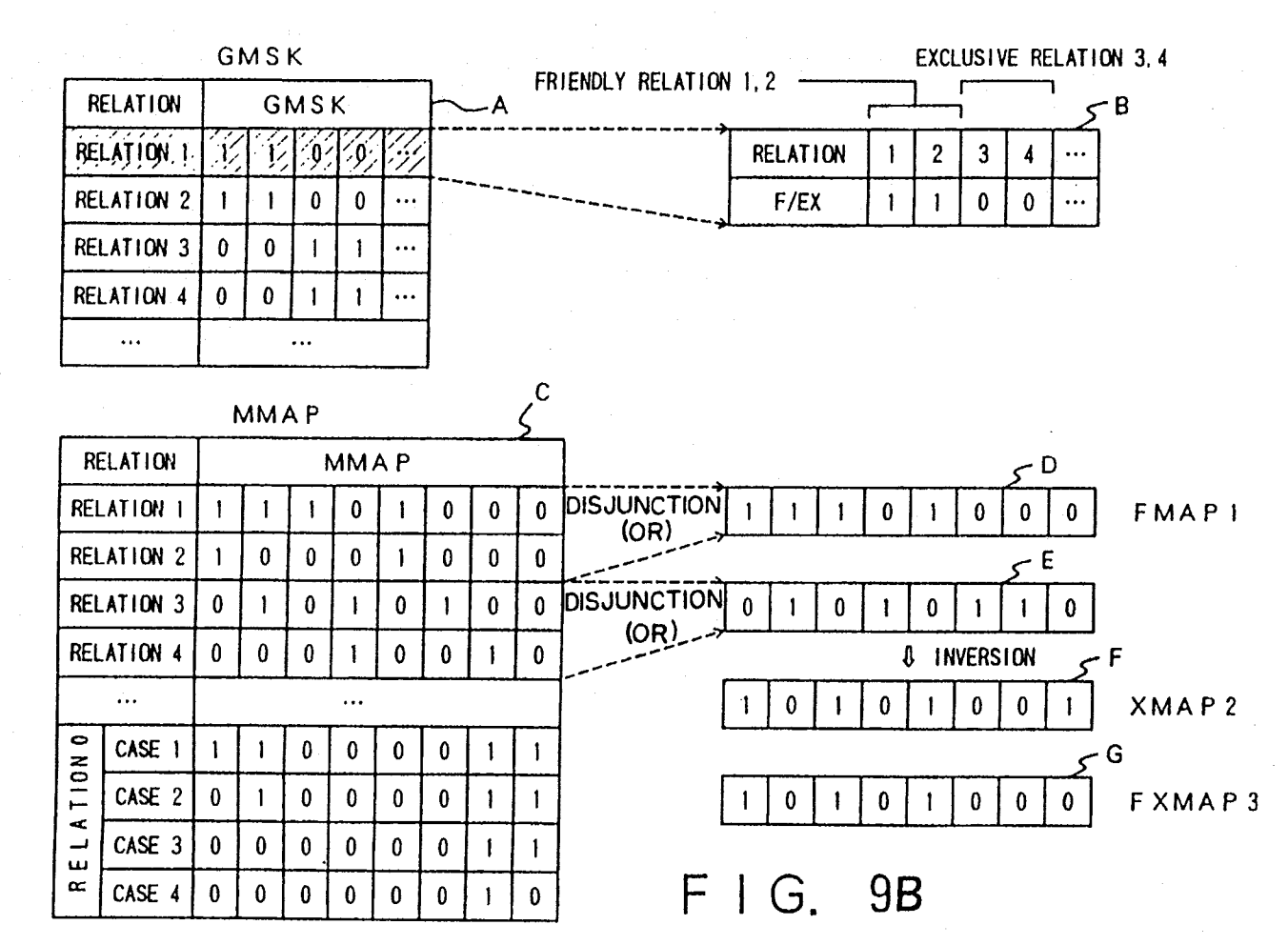

In a case shown in FIG. 9, group masks (GMSK) corresponding to four relations 1 through 4 are indicated by (A), and it is assumed that the relation 1 is to be allocated to a data page. The contents of the group mask (GMSK) corresponding to the relation 1 are indicated by (B). The respective bits (flags) of the group mask indicated by (B) are 1, 1, 0, and 0, so that the group mask corresponding to the relation 1 indicates that the relation 1 and the relation 2 are the friendly relations and the relation 1 and the relations 3 and 4 are exclusive relations.

In the decision process shown in FIG. 7, a fried/exclusive metamap is made (step S2). In this step, first the friend metamap (FMAP) and the exclusive metamap (XMAP) are cleared to "0". The following process is repeated at the number of times equal to the number of bits of the group mask (GMSK). Regarding each of bits (i) of a current BMSK in the common control table 15e (the contents thereof will be described later with reference to FIG. 12), steps S4 through S7 are repeated i times.

That is, a metamap (MMAP-i) is selected (step S4), and a bit i of the group mask (GMSK) is recognized (step S5). If the bit i has a value "1", a disjunction (OR) of the friend metamap (FMAP) and the metamap (MMAP-i) is calculated (step S6). If the bit i has a value "0", a disjunction (OR) of the exclusive metamap (XMAP) and the metamap (MMAP-i) is calculated (step S7). After this, the respective bits of the exclusive metamap (XMAP) are inverted and stored in the memory to use it later.

In the case shown in FIG. 9, respective bits of the group mask (GMSK) are "1100" as shown by (B). As the lead bit of the group mask (GMSK) is "1", disjunction (OR) of the respective bits of the friend metamap (FMAP) (initialized to "0") and corresponding bits of the metamap (MMAP) corresponding to the relation 1 shown by (C) is calculated so that a new friend metamap (FMAP) is obtained. The contents of the new friend metamap (FMAP) is equal to those of the metamap (MMAP) corresponding to relation 1. The process returns to step S4, the second bit of the group mask (GMSK) "1100" is also "1". Thus, the disjunction (OR) of the metamap (MMAP) corresponding to the relation 2 as shown by (C) in FIG. 9 and the friend metamap (FMAP) obtained above is calculated, so that a friend metamap (FMAP 1) as shown by (D) in FIG. 9 IS OBTAINED. The third bit of the group mask (GMSK) "1100" is "0". Thus, the disjunction (OR) of the exclusive metamap (XMAP) (initialized to "0") and the metamap (MMAP) corresponding to the relation 3 are calculated, so that a new exclusive metamap (XMAP) is obtained. As the fourth bit of the group mask (GMSK) "1100" is also "0", the disjunction (OR) of the new exclusive metamap (XMAP) and the fourth metamap (MMAP) is calculated, so that the exclusive metamap (XMAP) as shown by (E) in FIG. 9 is obtained. The bits of this (XMAP) are inverted (step S8 in FIG. 7), so that the exclusive metamap (XMAP 2) shown by (F) in FIG. 9 is obtained.

The friend metamap (FMAP 1) indicates page maps (corresponding positions of bits of "1") in each of which one of the relations to be arranged close to each other is stored. The exclusive metamap (XMAP 2) indicates metamaps (corresponding positions of bits of "1") in which exclusive relations not to be arranged close to each other are stored.

Returning to FIG. 7, the conjunction (AND) of the friend metamap (FMAP) and the exclusive metamap (XMAP) is calculated, a friend/exclusive metamap (FXMAP) is obtained (step S9 in FIG. 7). In this embodiment, the friend/exclusive metamap (FXMAP) ((3)=((1) & (2)) is shown by (G) in FIG. 9. The friend/exclusive metamap (FXMAP) indicates a position at which a page map having friendly relations is equal to a page map having no exclusive relations.

The process proceeds to step S10 shown in FIG. 8. In step S10, an allocating metamap (AMAP) is made. The conjunction (AND) of the relation-classified metamap corresponding to the relation 0 (a relation indicating positions of page maps including empty data pages: indicated by MMAP-0) and the friend/exclusive metamap (FXMAP) obtained above is calculated. It is then determined whether or not the above conjunction (AND) is "0" (step S11). If the conjunction (AND) is not "0", the conjunction (AND) is determined as the allocating metamap (AMAP) (step S12). An example of this case is represented using a case 1 of the relation 0 indicated by (C) in FIG. 8 and a case (a) shown in FIG. 10. That is, the conjunction (AND) of a metamap of the case 1 of the relation 0 indicated by (C) in FIG. 9 and the friend/exclusive metamap FXAP (3) indicated by (G) in FIG. 9 is calculated, so that the conjunction (AND) "10000000" is obtained. Thus, the page map 1 (corresponding to the lead bit of the conjunction (AND)) may be searched for empty data pages.

In step S11 shown in FIG. 8, if the conjunction (AND) is "0", the conjunction (AND) of the metamap (MMAP-0) corresponding to the relation 0 and the friend metamap (FMAP) is calculated, and it is determined then whether or not the result is "0" (step S12). If the result is not "0", the conjunction (AND) of the metamap (MMAP) and the friend (FMAP) is determined as the allocating metamap (AMAP) (step S13). This case is represented using a case 2 of the relation 0 indicated by (C) in FIG. 9 and a case (b) shown in FIG. 10. That is, since the conjunction (AND) of the metamap of the case 2 of the relation 0 indicated by (C) in FIG. 9 and the friend/exclusive metamap (FXMAP 3) indicated by (G) in FIG. 9 is "0", the conjunction (AND) of the metamap of the case 2 of the relation 0 and the friend metamap (FMAP 1) indicated by (D) in FIG. 9 is calculated. As a result, a bit of the conjunction (AND) corresponding to a page map 2 is "1". Thus, the page map (PMAP) 2 may be searched for empty data pages.

If both the conjunctions (AND) calculated in steps S11 and S13 are "0", the conjunction (AND) of the metamap (MMAP-0) corresponding to the relation 0 and the exclusive metamap (XMAP) is calculated (step S15). If this conjunction (AND) is not "0", this conjunction (AND) is determined as the allocating metamap (AMAP). This case is represented using a case 3 of the relation 0 shown by (C) in FIG. 9 and a case (c) shown in FIG. 10. That is, the conjunction (AND) of the metamap of the case 3 of the relation 0 shown by (C) in FIG. 9 and the friend/exclusive metamap (FXMAP 3) and the conjunction (AND) of the metamap of the case 3 and the friend metamap (FMAP 1) are "0". On the other hand, the conjunction (AND) of the metamap of the case 3 and the exclusive metamap (XMAP 2) indicated by (F) in FIG. 9 is not "0" such that the eighth bit (flag) of the conjunction (AND) is "0". Thus, the page map 8 may be searched for empty data pages.

In FIG. 8, if all the conjunction (AND) s calculated in steps S11, S13 and S15 are "0", it is determined whether or not the metamap (MMAP-0) corresponding to the relation 0 is "0" (step S17). If the metamap (MMAP-0) is not "0", the metamap- is determined as the allocating metamap (AMAP) as it is (step S18). On the other hand, if the metamap (MMAP-0) is "0", it is determined that the capacity of the data pages is insufficient. In this case, data items are stored empty pages without regard to the friendly relations and the exclusive relations. This case is represented using a case 4 of the relation 0 indicated by (C) in FIG. 9 and a case (c) indicated in FIG. 10. That is, the seventh bit of the metamap (MMAP-0) is "1", so that the page map (PMAP) 7 is searched for empty data pages.

When the allocating metamap (AMAP) is made in steps S10–S18, a page address of the allocating page map is determined (step S19 in FIG. 8). In this case, a position at which a bit has "0" in the allocating metamap (AMAP) is defined as the page address $P_m$ of the allocating page map (PMAP). Next, it is determined whether or not new identification information (a number or a name) of a relation to be allocated to a data page in the allocating page map (PMAP) is generated (step S20). That is, it is determined whether or not a bit at a position $P_m$ in a metamap (MMAP-r) corresponding to a relation identified by an identification information "r" is "0". If the bit is "0", the metamap (MMAP) corresponding to the allocated relation is updated. On the other hand, if the bit is not "0", the process is completed.

Returning to FIG. 6, when the above decision process (step S1 in FIG. 6) is completed, a look-up process with respect to a current page map (PMAP) is performed (step S2). In this look-up process, the page map (PMAP) (identified by $P_m$) for managing a data page to which the relation is to be allocated is defined as the current (PMAP). If the page map (identified by $P_m$) differs from the current page map (PMAP) which has been loaded in the main memory, the swapping process is performed.

Figure 11:
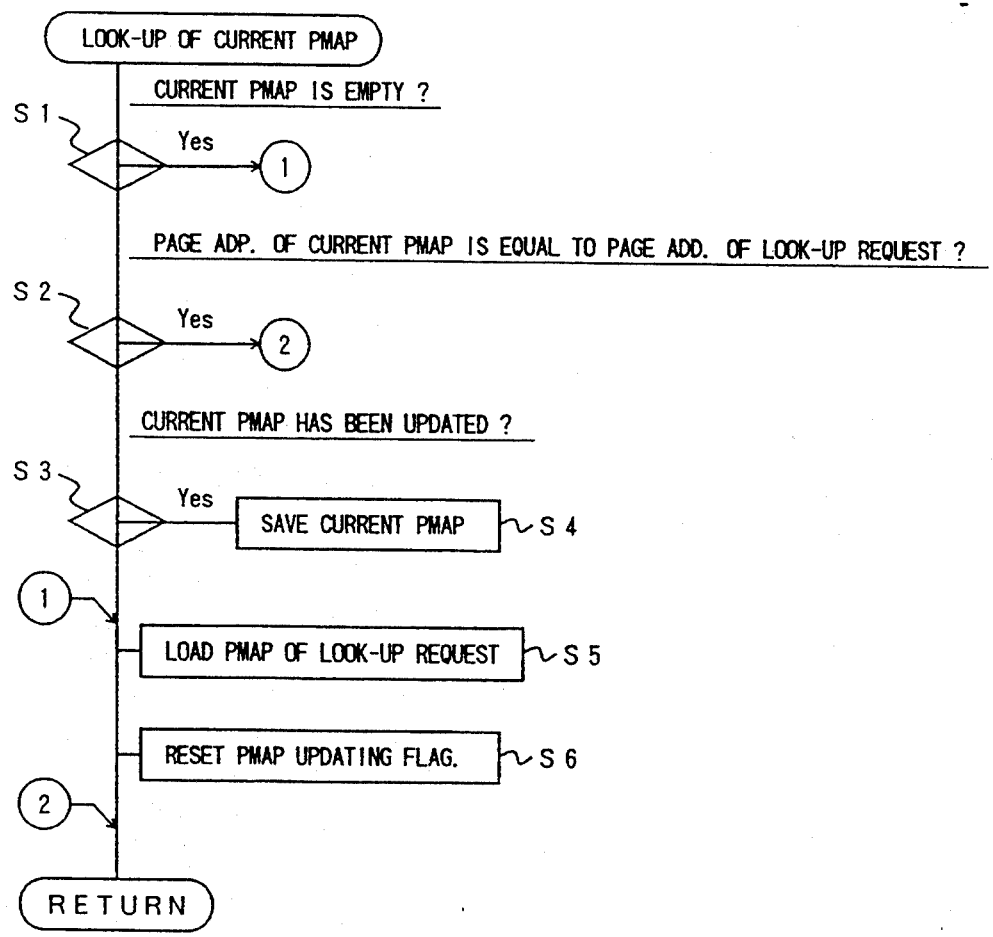
FIG. 11 is a flow chart illustrating a look-up process of a current PMAP.

The look-up process with respect to the current page map (PMAP) is performed in accordance with the flow chart shown in FIG. 11.

First, a description will now be given of the common control table 15e (shown in FIG. 3). Data items stored in this table are examples of data items under a specific condition.

Referring to FIG. 12, the lead section (a) is a command section, the command section indicates a command of a current process which is being carried out. In this case, the command section indicates the "allocating process". The next section (b) indicates an identification information identifying a relation to be allocated to a data page. In this case, this section indicates a "relation 1". The sections (c), (d), (e), (f), (g) and (i) are respectively provided with data times for a page address of the current data page, a buffer pointer of the current data page, a page address of he current page map (PMAP), a updating flag of the current page map (PMAP), a current group mask (GMSK), a current allocating metamap, and a current loading metamap. The information in the respective sections are used as a reference table and updated in the following process.

Referring to FIG. 11, it is determined whether or not the current page map (PMAP) is empty (step S1 in FIG. 11). In this case, it is determined whether a pointer of the current page map (PMAP) stored in the common control table 15e is in a NULL state (all bits are "0"), or there is provided a look-up request. If the current page map (PMAP) is empty, the process proceeds to a step for loading the page map (PMAP) for the look-up request.

If the current page map (PMAP) is not empty, it is determined whether or not a page address of the current page map (PMAP) is equal to the page address for the look-up request. If both the page addresses are equal to each other, the process is terminated (RETURN). On the other hand, if both the page address differ from each other, it is determined whether or not the current page map (PMAP) has been updated (the PMAP updating flag in the common control table is "1" or not) (step S3 in FIG. 11). If the current page map has been updated, the current page map (PMAP) is saved in the secondary storage unit 16. In the secondary storage unit 16, a seek operation by the page address of the current page map (PMAP) is accessed is carried out, and the contents of the current page map (PMAP) are written therein.

If the current page map (PMAP) has not been updated, the contents of the current page map (PMAP) is not needed to be saved in the secondary storage unit 16, so that the page map (PMAP) for the look-up request is loaded into the main memory (step S5 in FIG. 11). That is, after the seek operation by which the page address of the page map (PMAP) for the look-up request is accessed is carried out, the contents of the page map are read out from the secondary storage unit 16 and loaded into the common control table 15e. The updating flag of the page map in the common control table is reset to "1".

Returning to FIG. 6, when the above look-up process with respect to the current page map (PMAP) in step S2 is completed, the current page map (PMAP) is searched for an empty relation identification (step S3 in FIG. 6. In this process, when a relation identification (an identification number) "0" is detected, a position at which the relation identification is detected is initially detected is defined as $P_0$. A relation identification to be allocated to a data page is set to the empty relation identification (step S4 in FIG. 6). That is, in step S4, the relation identification r to be allocated to the data page is set to the relation identification at the position $P_0$ defined above.

The updating flag of the page map (PMAP) is then set (step S5 in FIG. 6). In step S5, the updating flag in the common control table is set to "1" (see the section f in FIG. 12). According this, when the swapping process for the current page map (PMAP) is carried out in the next look-up process for the current page map (PMAP), the contents of the current page map (PMAP) is saved in the secondary storage unit 16.

Next, it is determined whether or not there is no empty relation identification in the current page map (PMAP) (step S6 in FIG. 6). That is, while the current page map (PMAP) is being searched for an empty relation identification in step S3, the number of the empty relation identification is counted. The count value "1" represents that there is no empty relation identification. Thus, in step S6, it is determined whether or not the count value is "1". If there is no empty relation identification, a bit at the position $P_m$ in the metamap (MMAP) corresponding to the empty relation is set to "0", and the metamap (MMAP) corresponding to the empty relation is updated (step S7 in FIG. 6).

A description will now be given of the concrete process in steps S3 through S7 in FIG. 6, with reference to FIGS. 13 and 14.

A case shown in FIG. 13(a) corresponds to the above case 1, in which the page map (PMAP) 1 is searched for an empty data page. In this case, the data pages 3 and 4 among the data pages 1 through 4 correspond to the relation 0 (the empty relation), the data page 3 is set to $P_0$, and the relation 1 is set as the relation identification to this data page. As there is remaining empty data page in this page map (PMAP) 2, the metamap (MMAP) corresponding to the relation 0 is not updated.

A case shown in FIG. 13(b) corresponds to the above case 2, in which the page map (PMAP) 2 is searched for an empty data page. In this case, as the data page 8 corresponds to the relation 0, the relation 1 is allocated to the data page 8. At this time, there is no remaining empty data page in the page map (PMAP) 2 as shown in FIG. 13(b) (the result in the determination step S6 in FIG. 6 is YES.). Thus, a corresponding bit of the metamap (MMAP) (see the reference number 16b in FIG. 4 and (C) in FIG. 9) is updated to "1".

A case shown in FIG. 14(c) corresponds to the above case 3. As all the data pages in the page map (PMAP) 8 correspond to the empty relation 0, the relation 1 is allocated to the lead data page 29. In this case, as the relation 1 is allocated to a data page in the page map (PMAP) 8 for the first time, the metamap (MMAP) corresponding to the relation 1 is updated so that the eighth bit of the metamap (MMAP) corresponding to the relation 1 is set to "1".

A case shown in FIG. 14(d) corresponds to the above case 4. As a data page 28 in the page map (PMAP) 7 corresponds to the empty relation 0, the relation 1 is allocated to the data page 28. In this case, as there is no remaining empty data page in the page map (PMAP) 7, the metamap (MMAP) corresponding to the relation 0 is updated so that the seventh bit of the metamap is set to "0". In addition, as the relation 1 is allocated to a data page in the page map (PMAP) 7 for the first item, the metamap (MMAP) corresponding to the relation 1 is updated so that "0" in the metamap corresponding to the relation 1 is switched to "1".

Returning to FIG. 6, a page address on the data page to which the relation is allocated are calculated (step S8 in FIG. 6). The current data page address $P_j$ is calculated in accordance with the following equation, and the calculation result is stored in the section c for the current data page address of the common control table (see FIG. 12), $$P_J = S_p + P_0,$$

where $S_p$ is a number of relation identification items in each pages of the page map (PMAP).

An area for the page to which the relation is allocated is then ensured in the page buffer (step S9 in FIG. 6). In this step, a pointer value identifying the area ensured in the page buffer is set in the section (d) for the buffer pointer of the current data page in the common control table (see FIG. 12). When the pointer value is set in the common control table, the page allocating process is completed.

A description will now be given, with reference to FIG. 15, of a process corresponding to the page releasing operation belonging to the page operation carried out in the whole process shown in FIG. 5.

Figure 15:
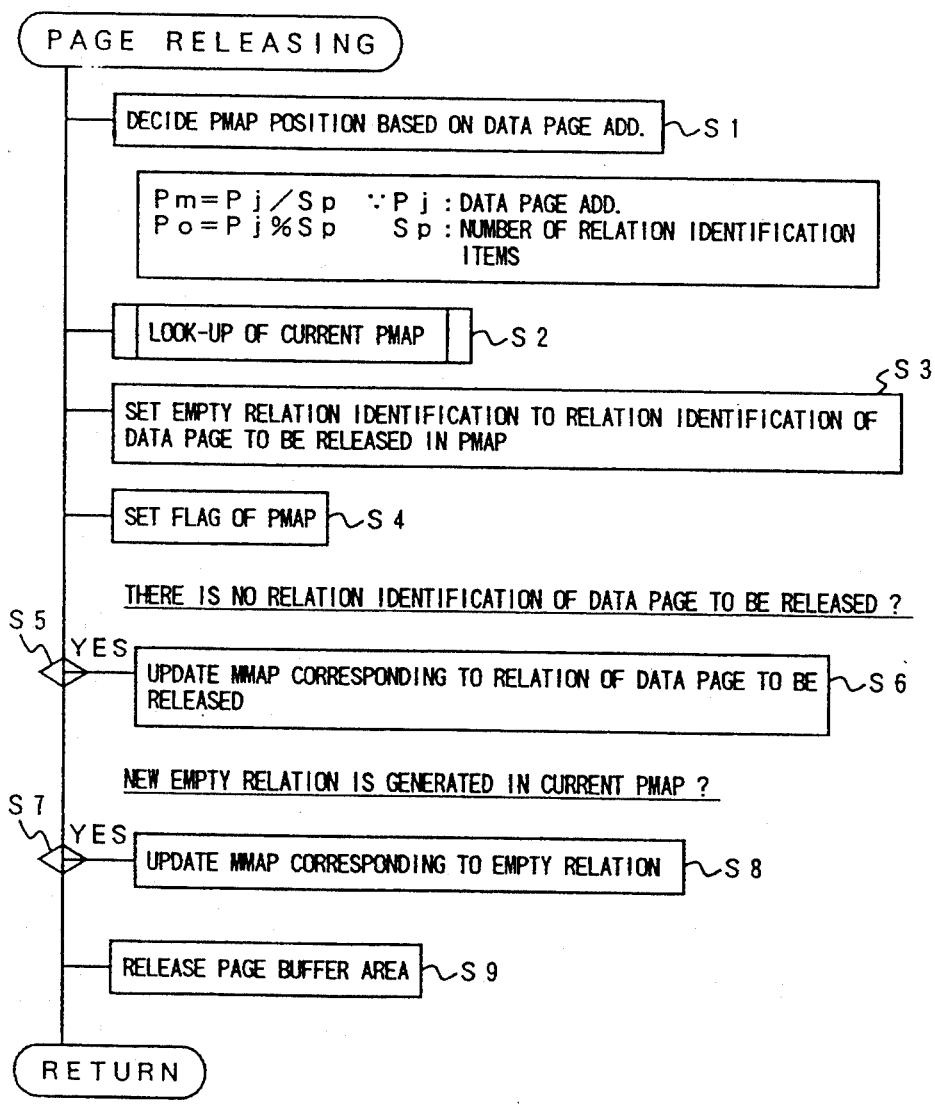
FIG. 15 is a flow chart illustrating a page releasing process.

Referring to FIG. 15, a position of the page map (PMAP) is decided based on a data page address identifying a data page to be released from the system (step S1 in FIG. 15). In this step, the page address is calculated in accordance with the following equation, $$P_m = P_j / S_p$$

$$P_0 = P_j \% S_p$$

where $P_m$ is a page address of the page map (PMAP), $P_0$ is a position at which the relation identification is positioned in the page map (PMAP), $P_j$ is a data page address, and $S_p$ is the number of relation identification items in each page of the page map (PMAP).

A look-up process for the current page map (PMAP) is performed (step S2 in FIG. 15). In this step, a page map (PMAP $P_m$) managing a data page to be released is selected to the current page map (PMAP), if the selected page map differs from the current page map (PMAP) loaded in the main memory, the selected page map is ensured in the main memory by the swapping process.

An empty relation identification is set into the relation identification corresponding to the data page to be released in the current page map (PMAP) (step S3 in FIG. 15). In this step, the position of the relation identification of the data page to be released in the current page map (PMAP) is denoted by $P_0$, a value of the relation identification at this point $P_0$ is changed from "r" which is a relation identification corresponding to the data page to be released to "0" for the empty relation identification.

Further, the updating flag for the page map (PMAP) is set to "1" in the common control table (step S4 in FIG. 15). According this, when the swapping process for the current page map (PMAP) is carried out in the next look-up process for the current page map (PMAP), the contents of the current page map (PMAP) is saved in the secondary storage unit 16. Next, it is determined whether or not there is no relation identification corresponding to the data page to be released in the current page map (PMAP) (step S5 in FIG. 15). That is, the number of relation identification items having the same value "r" as the relation identification corresponding to the data page to be released is counted, and if the count value is "0", it is determined that there is no relation identification corresponding to the data page to be released in the current page map (PMAP).

If it is determined that there is no relation identification corresponding to the data page to be released, a bit at the position $P_m$ in the metamap (MMAP-r) corresponding to the relation of the data page to be released is set to "0". It is then determined whether or not a new empty relation is produced in the current page map (PMAP) (step S7 in FIG. 15). In this step, the number of relation identification items, in the current page map (PMAP), having the same value "0" as the empty relation identification is counted, and if the count value is "1", it is determined that the new empty relation has been produced.

Here, if it is determined that the new empty relation has been produced, the metamap (MMAP) corresponding to the empty relation is updated (step S8 in FIG. 15). That is, a bit at position $P_m$ in the metamap (MMAP-0) corresponding to the empty relation is set to "0". After this, an area for a data page to be released in the current page map (PMAP) is released from the page buffer (step S9 in FIG. 15). That is, the pointer of the current buffer area and the page address of the current data are set to "NULL" (an undefined state).

Figure 17A:
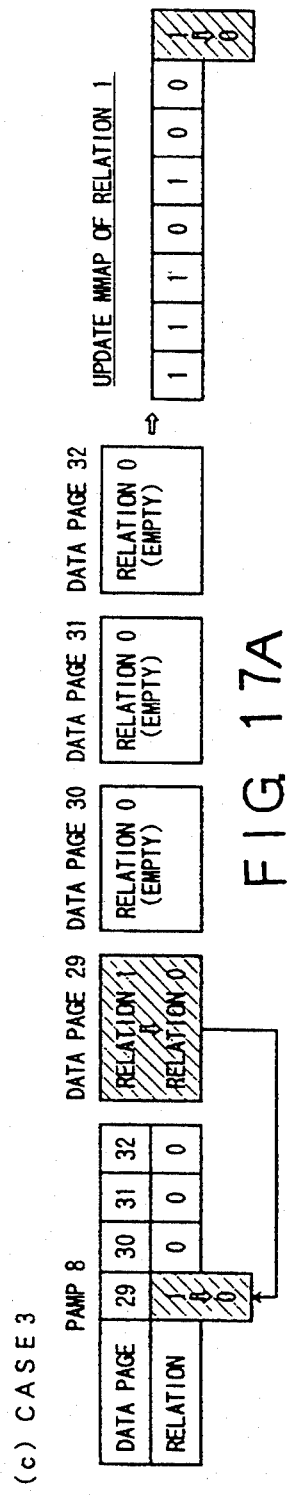
FIG. 17 is a diagram illustrating concrete examples a releasing process of data pages (a part 2).
Figure 17B:
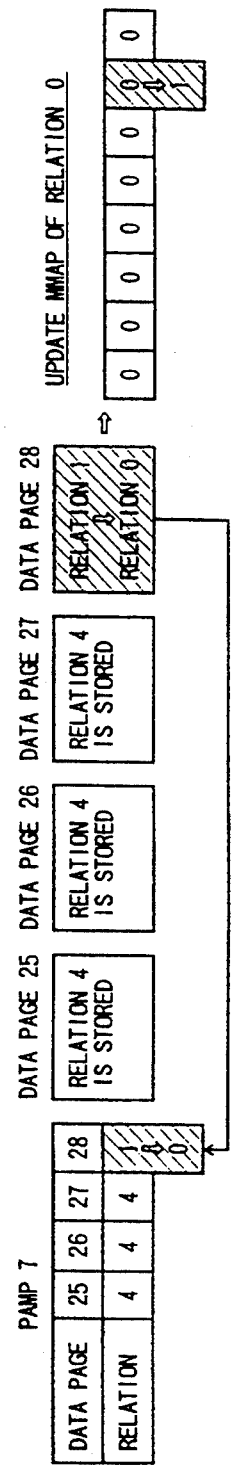

Examples of the above process corresponding to the page releasing operation are indicated in FIGS. 16 and 17.

A case shown in FIG. 16(a) corresponds to the above case 1, in which data page 3 is released from the page map (PMAP) 1. When data items belonging to the relation 1 allocated to the page 3 are released, the relation 1 is changed to relation 0 representing an empty relation in the data page 3 of the page map (PMAP) 1. The page map (PMAP) 1 previously has an empty data page, and the relation 1 has been also allocated to a data page 1. As a result, the metamap (MMAP-0) corresponding to the empty relation and the metamap (MMAP-1) corresponding to the relation 1 are not updated.

A case shown in FIG. 16(b) corresponds to the above case 2, in which the data page 8 in the page map (PMAP) 2 is released. In this case, the relation 1 is released from the data page 8 in the page map (PMAP) 2 as shown in FIG. 16(b), and the empty relation 0 is allocated to the data page 8. That is, new empty relation 0 is produced in the page map (PMAP) 2. Thus, the metamap (MMAP-0) corresponding to the empty relation 0 is updated so that the second bit of the metamap (MMAP-0) is set to "1" (indicating that an empty relation).

A case shown in FIG. 17(c) corresponds to the above case 3, in which the data page 29 is released from the page map (PMAP) 8. When the relation 1 is released from the data page 29 and the relation 0 is allocated to the data page 29, there is no data page to which the relation 1 is allocated. Thus, the metamap (MMAP-1) corresponding to the relation 1 is updated so that the end bit (the eighth bit) of the metamap (MMAP-1) corresponding to the relation 1 is set to "0".

A case shown in FIG. 17(d) corresponds to the above case 4, in which the data page 28 is released from the page map (PMAP) 7. When the relation 1 allocated to the data page 28 is changed to the relation 0, the new empty relation 0 is produced in the page map (PMAP) 7. Thus, the metamap (MMAP-0) corresponding to the empty relation 0 is updated so that the seventh bit of the metamap (MMAP-0) corresponding to the empty relation 0 is set to "1".

A description will now be given, with reference to FIG. 18, of the process corresponding to the page loading operation belonging to the page operation carried out in the whole process shown in FIG. 5.

Figure 18:
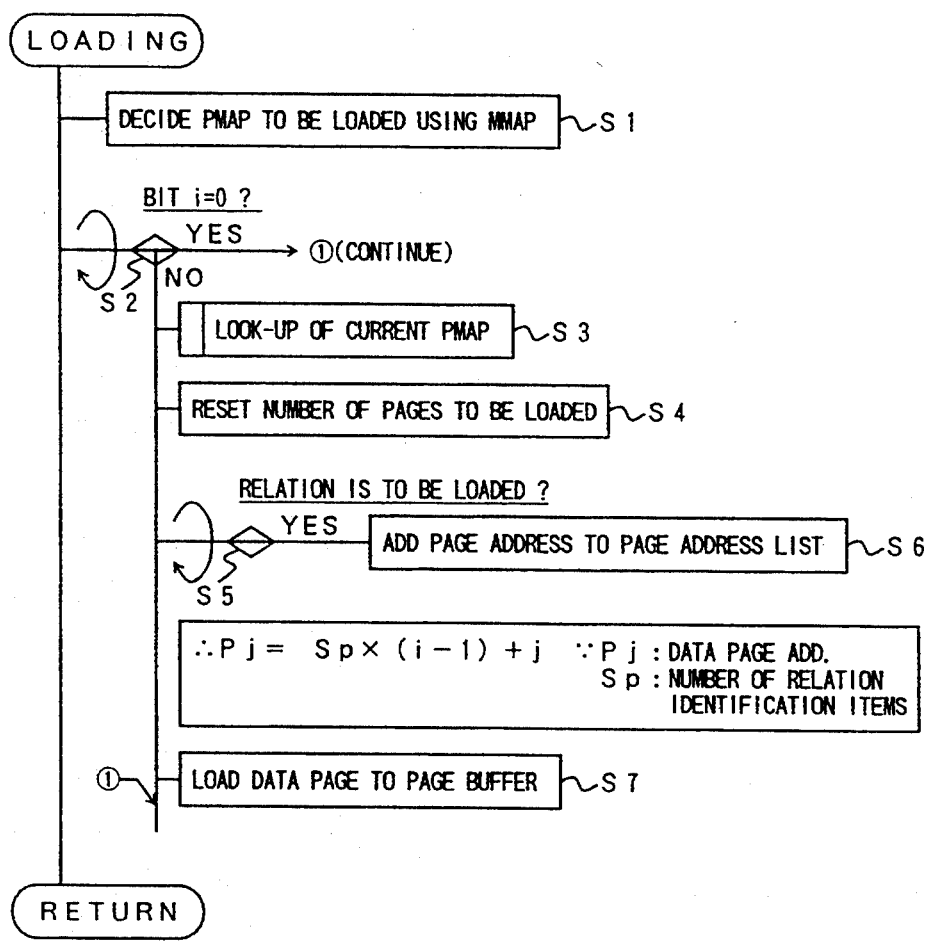
FIG. 18 is a flow chart illustrating a page loading process.

Referring to FIG. 18, a page map (PMAP) to be loaded is decided using the metamap (MMAP) (step S1 in FIG. 18). That is, the disjunction (OR) of bits of metamaps (MMAP) corresponding to a plurality of relations (e.g. relation identification items r and s) is calculated, the value of the disjunction (OR) is loaded into the section (i) for the current loading metamap in the common control table (see FIG. 12).

The following steps S2 through S7 are repeatedly performed for the number of times equal to the number of bits of the metamap (MMAP). In this case, with respect to respective bits of the current loading metamap in the common control table, the following process is repeatedly performed for i-times.

First, it is determined whether or not i-th bit is "0" (step S2 in FIG. 18). If the i-th bit is "0", the process is continued with respect to the next bit. On the other hand, if the i-th bit is "1", the look-up process for the current page map (PMAP) is performed (step S3 in FIG. 18). In this step, the page map (PMAP) is ensured in a page address ($P_m = i$) of the main memory.

The number of pages to be loaded is reset to "0" (step S4 in FIG. 18), and the following steps S5 and S6 are repeated performed with respect to all the relation identification items in the current page map (PMAP). Here, it is assumed that the number of times for which these steps are repeatedly performed is denoted by j, and that each of the relations denoted by $R_j$.

That is, it is determined whether or not each relation identification is equal to the relation identification corresponding to data items to be loaded (step S5). Concretely, it is determined whether or not $R_j$ is equal to r ($R_j = r$), or whether or not $R_j$ is equal to s ($R_j = s$). If a relation identification is equal to the relation identification corresponding to the data items to be loaded, a page address of a data page corresponding to the relation identification is added to a page address list provided in the main memory for pages to be loaded (S6). On the other hand, if a relation identification is not equal to the relation identification corresponding to the data items to be loaded, the above process is carried out with respect to the next relation identification in the page map (PMAP).

After the above steps S5 and S6 are repeatedly carried out with respect to all the relation identification items in the page map (PMAP), data pages are loaded into the page buffer 15f (step S7 in FIG. 18). In this case, if data page addresses in the page address list are continual or intervals between the page address are small, the seek operation and the read operation for the data page addresses are repeatedly carried out, so that the data pages are loaded into the page buffer. The above process are repeatedly carried out with respect to the respective bits of the metamap (MMAP), and the page loading operation is completed.

Figure 19:
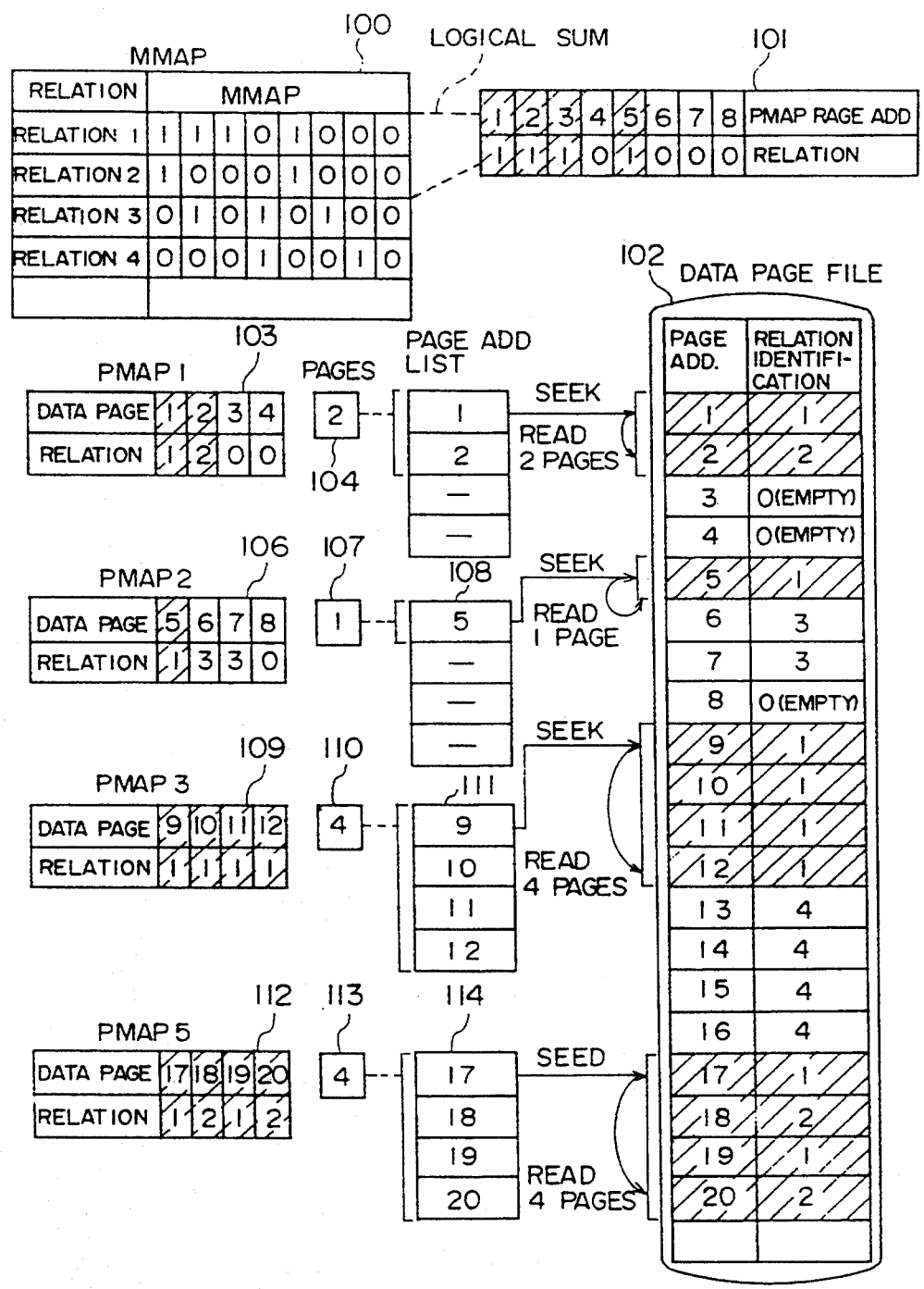
FIG. 19 is a diagram illustrating concrete examples of data pages which are to be loaded into a main storage.

FIG. 19 shows concrete examples of cases in which the above process corresponding to the page loading operation. In FIG. 19, a relation 1 and a relation 2 are the relation identification corresponding to the data page to be loaded. When the disjunction (OR) of the relation 1 and relation 2 in the metamap (MMAP) 100 is calculated, a metamap (MMAP) 101 including the relation 1 or relation 2 is obtained. The metamap (MMAP) 101 is set as the current loading metamap in the section (i) of the common control table (see FIG. 12). In this example, data pages in page maps (PMAPS) corresponding to the first, second, third and fifth bits in the metamap (MMAP) 101, each bit being set to "1", are loaded into the page buffer.

A page map (PMAP) 1 identified by the lead bit (the first bit) of the metamap (MMAP) 101 is shown by a reference numeral 103 in FIG. 19. The look-up process for the current page map (PMAP) is carried out (the current page map (PMAP) is ensured in the main memory), and it is determined whether or not a relation to be loaded exists in the page map (PMAP) 1. As a result, it is determined that the relation 1 and the relation 2 are respectively stored in the data pages 1 and 2. A value "2" representing that two pages have been detected is set to a register 104, and page numbers "1" and "2" of the data pages 1 and 2 are set in the page address list 105. In this example, respective page addresses correspond to the page number. Thus, addressing of the data pages is performed using page numbers.

The seek operation is carried out in the data page file (the secondary storage unit), so that data items for the two pages 1 and 2 in the page address stored in the page address list 105 are loaded into the page buffer 15f.

When the loading of the page map (MPAP) is completed, the second bit of the metamap (MMAP) 101, which bit is set to "1", is detected, and the look-up operation with respect to the page map (PMAP) 2 corresponding to the second bit of the metamap (MMAP) 101 is carried out. The above process with respect to the page map (PMAP) 2 shown by a reference numeral 106 in FIG. 19 is performed in the same manner as in the above case. In this example, as the relation 1 exists in the data page 5 of the data map (PMAP) 2, a value "1" representing a number of pages is set in a resistor 107, and a value "5" is set in the page address list 108. Data items of the data page 5 is loaded from the data page file 102 to the main memory. As to other page maps (PMAP) 3 and 5, the data items belonging to the relations 1 and 2 are loaded from the data page file 102 to the main memory in the same manner as in the above case.

In the above embodiment, bits data items are used as the metamap (MMAP) information. However, the system may be also constituted so that a number of data pages for each relation and a number of empty page in each page map (PMAP) are managed. In this case, it can be omitted to allocate data items to each page, to determine whether or not there are an empty page and a data page corresponding to respective relations, and to count the number of data page in the page map (PMAP). However, in this case, a large-size metamap (MMAP) is needed.

In addition, in the above embodiment, data items belonging to a single kind of relation are loaded into a single page. However, in a case where the clustering regarding both the record and the page is carried out, data items belonging to a plurality of relations may exist in a single page. To materialize this, a group of relations enabling to exist in the same page is defined as a clustering group so that management and processing are performed for each clustering group, and each record in each data page has identification data indicating a relation to which each record belongs.

According to the above embodiment, the empty pages and pages to which relations are allocated are managed using page map information. Thus, when pages in which data items belonging to respective relations are loaded into the main memory, data items belonging to relations can be loaded into the main memory in a physical order of the relations in the page map without tracing the address link of the pages. As a result, the number of seek operation can be decreased. Thus, the data items of each relation can be rapidly loaded into the main memory. Furthermore, the empty page and relation-classified pages in the page map is managed using the metamap management information. Thus, a page map in which a page to be loaded exists can be rapidly detected.

In addition, pages in which data items belonging to relations relevant to each other are stored can be loaded into the main memory using results obtained by logical operation of metamaps and the searching of the page map.

Further, due to the logical operation of metamaps corresponding to friendly relations and exclusive relations and a metamap corresponding to the empty page is performed, the clustering regarding the page can be improved. Even if data items relevant to each other are not stored in the same page, the clustering regarding page can be achieved at a high level.

The relationships between the friendly relations and the exclusive relations are managed using relation group information. Thus, metamaps of which the logical operation is to be performed can be easily identified, so that page map having a page to which relations are to be allocated can be rapidly decided.

The present invention is not limited to the aforementioned embodiments, and variations and modifications may be made without departing from the scope of the claimed invention.

What is claimed is:

1. A file storage management system for managing pages in a file, in which pages, data items belonging to a plurality of relations are stored, said file storage management system comprising:

a data file for storing data items belonging to relations page by page;

a page map file storing information representing positions at which data pages and empty pages are positioned in the file, the data pages storing data items belonging to relations, the empty pages storing no data item;

a metamap file for storing metamap information representing whether or not the data empty pages and the data pages exist in each page map;

relation group definition file for information representing whether relations are friendly relations or exclusive relations, the friendly relations being relations relevant to each other and caused to be stored close to each other, the exclusive relations being relations not relevant to each other;

page management means for managing said data file;

page map management means for managing said page map file;

metamap management means for managing said metamap file;

relation group management means for managing said relation group definition file; and page operation means for operating said page management means, said page map management means, said metamap management means, said relation group management means so that a process for allocating data items belonging to relations to pages, and a process for searching for pages to be released from management in said system and for pages storing data items to be loaded into a main memory are carried out.

2. The system as claimed in claim 1, wherein said page map file is provided with information representing whether each page is used or is empty, an identification item for identifying a page which is empty and an identification item for identifying a relation stored in a page, said page map management means, when a relation stored in a page is loaded in said main memory in accordance with an operation of said page operation means, searching said page map file for page addresses starting from a page having an identification items of a relation having data items to be loaded, and said page map management means searching said page map file for page addresses starting from a page having an identification item of a page which is empty in the process for allocating data items belonging to relations to pages.

3. The system as claimed in claim 1, wherein the metamap file corresponding to the data empty page is provided with a flag indicating whether or not each page in the page map includes a data empty page, and metamap file corresponding to a relation is provided with a flag indicating whether or not each page in the page map includes a data page corresponding to the relation, wherein said metamap management means inactivates the flag of the metamap file corresponding to the data empty page when there is no data empty page in the page in the page map to which data items to be allocated in the process for allocating the data items to the pages, and said metamap management means activating the flag of the metamap file corresponding to the empty page when a data empty page is generated in the page map in a process for releasing a page to which data items are allocated, and wherein said metamap management means activates the flag of the metamap file corresponding to the relation when a page to which data items belonging to the relation are to be allocated is generated in the page of the page map in the process for allocating the data items to the pages, and said metamap management means inactivates the flag of the metamap file corresponding to the relation when there is no page for the relation in the page of the page map in the process for releasing a page to which data items are allocated.

4. The system as claimed in claim 3, wherein in a process for loading pages relation by relation, said metamap management means specifies a page map in which a page for the relation exists in accordance with information representing whether or not a page corresponding to the relation exists in each page map, the information being recorded in the metamap information corresponding to the relation of data items to be loaded.

5. The system as claimed in claim 3, wherein in a process for loading a page for a plurality of relations, said metamap management means specifies a page map in which the page for the plurality of relations exist in accordance with information representing whether or not a result obtained by a disjunction (OR) of the metamaps corresponding to the plurality of relations exist in each page map.

6. The system as claimed in claim 3, wherein in the process for allocating data items belonging to relations to pages, said metamap management means specifies a page map in which a page exists based on a result obtained by a conjunction (AND) of a friendly metamap and metamap information corresponding to a page which is empty, the friendly metamap being a disjunction (OR) between metamap information corresponding to the friendly relations including a relation of data items to be loaded.

7. The system as claimed in claim 6, wherein in the process for allocating data items belonging to relations to pages, said metamap management means specifies a page map in which an empty page exists based on a result obtained by a conjunction (AND) of an exclusive metamap and metamap information corresponding to an empty page, the exclusive metamap being obtained by a non-disjunction (NOR) of metamap information items corresponding to the exclusive relations.

8. The system as claimed in claim 7, wherein in the process for allocating data items belonging to relations to pages, said metamap management means specifies a page map in which an empty page exists based on a result obtained by a conjunction (AND) of a friend/exclusive metamap and metamap information corresponding to an empty page, the friend/exclusive metamap being a conjunction (AND) between the friend metamap and the exclusive metamap.

9. The system as claimed in claim 8, wherein in the process for allocating data items belonging to relations to pages, said metamap management means carries out a first conjunction (AND) using the friend/exclusive metamap and the metamap information corresponding to the data empty page, and searches a page map having a data empty page which page map is obtained by a result of the first conjunction (AND) for a page to which data items are to be allocated, wherein said metamap management means carries out a second conjunction (AND) using the friend metamap or the exclusive metamap and the metamap information corresponding to the empty data page when the page map is not obtained by the result of the first conjunction (AND), and searches a page map having a data empty page which page map is obtained by a result of the first conjunction (AND) for a page to which data items are to be allocated, and wherein said metamap management means determines, based on the metamap information corresponding to a data empty page, a page map which is searched for a page to which data items are allocated when a page map having a data empty page is not obtained by the result of the second conjunction (AND).

10. The system as claimed in claim 6, wherein said relation group management means manages said relation group definition file, and in the process for allocating data items belonging to relations to pages, said relation group means specifying metamap information corresponding to the friendly relations including the relation of the data items to be loaded, the metamap information being used to obtain the friend metamap.

11. The system as claimed in claim 7, wherein said relation group management means manages said relation group definition file, and in the process for allocating data items belonging to relations to pages, said relation group means specifying metamap information corresponding to the exclusive relations, the metamap information being used to obtain the exclusive metamap.

12. The system as claimed in claim 8, wherein said relation group management means manages said relation group definition file, and in the process for allocating data items belonging to relations to pages, said relation group means specifying metamap information corresponding to the friendly relations including the relation of the data items to be loaded and the exclusive relations, the metamap information being used to obtain the friend metamap and the exclusive metamap.

13. The system as claimed in claim 9 wherein said relation group management means manages said relation group definition file, and in the process for allocating data items belonging to relations to pages, said relation group means specifying metamap information corresponding to the friendly relations including the relation of the data items to be loaded and the exclusive relations, the metamap information being used to obtain the friend metamap and the exclusive metamap.

14. The system as claimed in claim 1, wherein data items belonging to a plurality of relations exist in a single page and pages in the file are managed by a clustering regarding records in each page, and wherein the management and the operations are executed with respect to clustering groups each by said page map management means, said metamap management means and said relation group management means, each of said clustering group being a set of relations included in a single page.

* * * * *